(12) United States Patent
Zhao

(10) Patent No.: US 10,477,519 B2
(45) Date of Patent: Nov. 12, 2019

(54) RESOURCE ALLOCATION METHOD AND APPARATUS

(71) Applicant: HUAWEI TECHNOLOGIES CO., LTD., Shenzhen (CN)

(72) Inventor: Zhenshan Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/829,583

(22) Filed: Dec. 1, 2017

(65) Prior Publication Data

US 2018/0103456 A1  Apr. 12, 2018

Related U.S. Application Data

(63) Continuation of application No. PCT/CN2015/080598, filed on Jun. 2, 2015.

(51) Int. Cl.
*H04W 72/04* (2009.01)
*H04W 48/04* (2009.01)
*H04W 64/00* (2009.01)
*H04W 72/02* (2009.01)

(52) U.S. Cl.
CPC .......... *H04W 72/04* (2013.01); *H04W 48/04* (2013.01); *H04W 64/00* (2013.01); *H04W 72/02* (2013.01)

(58) Field of Classification Search
None
See application file for complete search history.

(56) References Cited

U.S. PATENT DOCUMENTS

| | | | |
|---|---|---|---|
| 2006/0050742 A1* | 3/2006 | Grandhi | H04B 7/0413 370/506 |
| 2006/0258382 A1 | 11/2006 | Zhang et al. | |
| 2007/0002821 A1* | 1/2007 | Carlson | H04L 29/06 370/349 |
| 2009/0046650 A1* | 2/2009 | Dalsgaard | H04L 1/1812 370/329 |

(Continued)

FOREIGN PATENT DOCUMENTS

| | | |
|---|---|---|
| CN | 1549474 A | 11/2004 |
| CN | 101132617 A | 2/2008 |

(Continued)

OTHER PUBLICATIONS

International Search Report and Written Opinion (including English translation) issued in corresponding International Application No. PCT/CN2015/080598, dated Feb. 26, 2016, 21 pages.

(Continued)

*Primary Examiner* — Otis L Thompson, Jr.
(74) *Attorney, Agent, or Firm* — Leydig, Voit & Mayer, Ltd.

(57) ABSTRACT

Methods and devices are provided for resource allocation. The method may include: receiving a resource allocation request sent by first UE, where the first UE is any UE within coverage of a base station; when the resource allocation request carries a transmission resource index obtained by the first UE through listening, allocating a transmission resource to the first UE according to the transmission resource index; and sending the allocated transmission resource to the first UE.

18 Claims, 11 Drawing Sheets

(56) References Cited

U.S. PATENT DOCUMENTS

| | | | |
|---|---|---|---|
| 2009/0082031 A1* | 3/2009 | Kim | H04W 72/1263 |
| | | | 455/452.2 |
| 2009/0233654 A1* | 9/2009 | Lee | H04W 52/0235 |
| | | | 455/574 |
| 2009/0305716 A1 | 12/2009 | Ono | |
| 2010/0041445 A1* | 2/2010 | Qi | H04W 52/0251 |
| | | | 455/574 |
| 2011/0126037 A1* | 5/2011 | Jin | H04W 52/0225 |
| | | | 713/323 |
| 2011/0305158 A1* | 12/2011 | Kim | H04W 72/005 |
| | | | 370/252 |
| 2014/0286320 A1* | 9/2014 | He | H04W 74/006 |
| | | | 370/336 |
| 2016/0128024 A1* | 5/2016 | Frederiks | H04W 72/04 |
| | | | 370/329 |
| 2016/0183239 A1 | 6/2016 | Lee et al. | |
| 2016/0198504 A1* | 7/2016 | Seo | H04W 76/14 |
| | | | 370/329 |
| 2016/0205675 A1* | 7/2016 | Zhang | H04W 72/044 |
| | | | 455/450 |
| 2016/0270068 A1* | 9/2016 | Akyurek | H04W 72/04 |
| 2017/0006560 A1* | 1/2017 | Siomina | H04W 56/0045 |
| 2017/0013655 A1* | 1/2017 | Martin | H04W 76/14 |
| 2017/0048722 A1* | 2/2017 | Van Phan | H04W 16/16 |
| 2017/0181000 A1* | 6/2017 | Chang | H04W 16/14 |
| 2017/0303272 A1 | 10/2017 | Li et al. | |
| 2018/0324823 A1* | 11/2018 | Martin | H04W 72/042 |
| 2018/0343670 A1* | 11/2018 | Park | H04W 74/006 |

FOREIGN PATENT DOCUMENTS

| | | |
|---|---|---|
| CN | 102711216 A | 10/2012 |
| CN | 102740467 A | 10/2012 |
| CN | 102958066 A | 3/2013 |
| CN | 103517343 A | 1/2014 |
| CN | 104202821 A | 12/2014 |
| CN | 106171025 A | 11/2016 |
| WO | 2006020520 A2 | 2/2006 |
| WO | 2015020356 A1 | 2/2015 |

OTHER PUBLICATIONS

CN/201580050757.4, Office Action, dated Mar. 27, 2019.

* cited by examiner

RESOURCE ALLOCATION METHOD AND APPARATUS

CROSS-REFERENCE TO RELATED APPLICATIONS

This application is a continuation of International Application No. PCT/CN2015/080598, filed on Jun. 2, 2015, the disclosure of which is hereby incorporated by reference in its entirety.

TECHNICAL FIELD

The present disclosure relates to the field of communications technologies, and in particular, to a resource allocation method and an apparatus.

BACKGROUND

Internet of Vehicles (IoV) is a new management service network based on a combination of the Internet and the Internet of Things technologies and integrating multitudinous software technologies and information service content. In the Internet of Vehicles, with vehicles as nodes and information sources, "human-vehicle-road-environment-society" communication is implemented by using advanced sensing technologies, network technologies, and wireless communications technologies, and by means of mass information processing and sharing by using vehicles or mobile phones. In this way, intelligent identification, positioning, tracking, supervision, and push services are achieved, and drive experience and services that are more intelligent, safer, more environment-friendly, and more comfortable are implemented.

Because a vehicle is equipped with a communications unit, the vehicle may be considered as user equipment (UE). In the prior art, before the UE needs to communicate with another UE or another device, the UE may send a transmission resource request to a base station. When the base station receives the transmission resource request sent by the UE, the base station cannot determine a location of the terminal according to the transmission resource request. Therefore, the base station allocates different transmission resources to different UEs to avoid a transmission collision that may be caused by allocating a same transmission resource to vehicles when locations of the vehicles are unknown. In this way, the UE can normally communicate with another UE by using the allocated transmission resource, and further, "human-vehicle-road-environment-society" communication is implemented.

In a process of implementing the present disclosure, the inventor finds that the prior art has at least the following problem:

When there are a large quantity of UEs in cells within coverage of the base station, and the vehicles require a large quantity of transmission resources, because the transmission resources within the coverage of the base station are limited and cannot be multiplexed, the base station possibly has no remaining resource for allocation. Consequently, some vehicles cannot perform communication, a transmission resource multiplex rate is low, and communication efficiency of the vehicles is low.

SUMMARY

To implement proper transmission resource allocation and increase a transmission resource multiplex rate and a success rate of communication between vehicles in the Internet of Vehicles, embodiments of the present disclosure provide a resource allocation method and an apparatus. The technical solutions are as follows:

According to a first aspect, a base station is provided, and the base station includes:

a receiving module, configured to receive a resource allocation request sent by first user equipment UE, where the first UE is any UE within coverage of the base station;

an allocation module, configured to allocate, if the resource allocation request received by the receiving module carries a transmission resource index obtained by the first UE through listening, a transmission resource to the first UE according to the transmission resource index; and a sending module, configured to send, to the first UE, the transmission resource allocated by the allocation module.

According to a second aspect, user equipment is provided, and the user equipment includes:

a receiving module, configured to receive listening setting information, where the listening setting information is used to notify the UE of a duration of listening;

a determining module, configured to determine, according to the listening setting information received by the receiving module, a duration of listening to be performed on transmission resources within coverage of a base station;

a listening module, configured to listen to the transmission resources within the coverage of the base station; and a sending module, configured to send a resource allocation request to the base station when a duration of the listening performed by the listening module reaches the preset duration determined by the determining module, so that the base station allocates a transmission resource according to the resource allocation request; where the receiving module is further configured to receive the transmission resource allocated by the base station.

According to a third aspect, user equipment is provided, and the user equipment includes:

a receiving module, configured to receive a broadcast message, where the broadcast message carries a transmission resource index allocated to first UE and second UE;

a detection module, configured to perform detection on a transmission resource according to the transmission resource index received by the receiving module;

a generation module, configured to generate a resource collision message when the detection module determines that a resource collision exists on the transmission resource; and a sending module, configured to send the resource collision message generated by the generation module to a base station, so that the base station determines, according to the resource collision message, that the resource collision exists between the first UE and the second UE.

According to a fourth aspect, a base station is provided, and the base station includes:

a receiving module, configured to receive a resource allocation request from first UE, where the first UE is any UE within coverage of the base station;

an obtaining module, configured to obtain location information of the first UE;

a determining module, configured to determine, according to the location information of the first UE that is obtained by the obtaining module and location information of UEs to which transmission resources are currently already allocated, second UE that meets a preset condition, where the preset condition is that a distance between the second UE and the first UE is greater than a first preset distance;

an allocation module, configured to allocate, to the first UE, a transmission resource already allocated to the second UE determined by the determining module; and a sending module, configured to send, to the first UE, the transmission resource allocated by the allocation module.

According to a fifth aspect, user equipment is provided, and the user equipment includes:

a sending module, configured to send a resource allocation request to a base station; where the sending module is configured to send location information of the user equipment to the base station, so that the base station allocates a transmission resource according to the location information of the user equipment and location information of UEs to which transmission resources are currently already allocated; and a receiving module, configured to receive the transmission resource allocated by the base station.

According to a sixth aspect, a resource allocation method is provided, and the method includes:

receiving a resource allocation request sent by first UE, where the first UE is any UE within coverage of a base station;

if the resource allocation request carries a transmission resource index obtained by the first UE through listening, allocating a transmission resource to the first UE according to the transmission resource index; and sending the allocated transmission resource to the first UE.

According to a seventh aspect, a resource allocation method is provided, and the method includes:

receiving listening setting information, where the listening setting information is used to notify UE of a duration of listening;

determining, according to the listening setting information, a duration of listening to be performed on transmission resources within coverage of a base station;

listening to the transmission resources within the coverage of the base station;

when a duration of the listening reaches the preset duration, sending a resource allocation request to the base station, so that the base station allocates a transmission resource according to the resource allocation request; and receiving the transmission resource allocated by the base station.

According to an eighth aspect, a resource allocation method is provided, and the method includes:

receiving a broadcast message, where the broadcast message carries a transmission resource index allocated to first UE and second UE;

performing detection on a transmission resource according to the transmission resource index;

when determining that a resource collision exists on the transmission resource, generating a resource collision message; and sending the resource collision message to a base station, so that the base station determines, according to the resource collision message, that the resource collision exists between the first UE and the second UE.

According to a ninth aspect, a resource allocation method is provided, and the method includes:

receiving a resource allocation request from first UE, where the first UE is any UE within coverage of a base station;

obtaining location information of the first UE;

determining, according to the location information of the first UE and location information of UEs to which transmission resources are currently already allocated, second UE that meets a preset condition, where the preset condition is that a distance between the second UE and the first UE is greater than a first preset distance;

allocating, to the first UE, a transmission resource already allocated to the second UE; and sending the allocated transmission resource to the first UE.

According to a tenth aspect, a resource allocation method is provided, and the method includes:

sending a resource allocation request to a base station;

sending location information of user equipment to the base station, so that the base station allocates a transmission resource according to the location information of the user equipment and location information of UEs to which transmission resources are currently already allocated; and receiving the transmission resource allocated by the base station.

According to an eleventh aspect, a base station is provided, and the base station includes a transmitter, a receiver, a memory, and a processor that is connected to the transmitter, the receiver, and the memory separately, where the memory stores a group of program code, and the processor is configured to invoke the program code stored in the memory, so that the processor is configured to perform the following operations: receiving a resource allocation request sent by first UE, where the first UE is any UE within coverage of the base station; if the resource allocation request carries a transmission resource index obtained by the first UE through listening, allocating a transmission resource to the first UE according to the transmission resource index; and sending the allocated transmission resource to the first UE.

According to a twelfth aspect, user equipment is provided, and the user equipment includes a transmitter, a receiver, a memory, and a processor that is connected to the transmitter, the receiver, and the memory separately, where the memory stores a group of program code, and the processor is configured to invoke the program code stored in the memory, so that the processor is configured to perform the following operations: receiving listening setting information, where the listening setting information is used to notify the UE of a duration of listening; determining, according to the listening setting information, a duration of listening to be performed on transmission resources within coverage of a base station; listening to the transmission resources within the coverage of the base station; when a duration of the listening reaches the preset duration, sending a resource allocation request to the base station, so that the base station allocates a transmission resource according to the resource allocation request; and receiving the transmission resource allocated by the base station.

According to a thirteenth aspect, user equipment is provided, and the user equipment includes a transmitter, a receiver, a memory, and a processor that is connected to the transmitter, the receiver, and the memory separately, where the memory stores a group of program code, and the processor is configured to invoke the program code stored in the memory, so that the processor is configured to perform the following operations: receiving a broadcast message, where the broadcast message carries a transmission resource index allocated to first UE and second UE; performing detection on a transmission resource according to the transmission resource index; when determining that a resource collision exists on the transmission resource, generating a resource collision message; and sending the resource collision message to a base station, so that the base station determines, according to the resource collision message, that the resource collision exists between the first UE and the second UE.

According to a fourteenth aspect, a base station is provided, and the base station includes a transmitter, a receiver, a memory, and a processor that is connected to the transmitter, the receiver, and the memory separately, where the memory stores a group of program code, and the processor is configured to invoke the program code stored in the memory, so that the processor is configured to perform the following operations: receiving a resource allocation request from first UE, where the first UE is any UE within coverage of the base station; obtaining location information of the first UE; determining, according to the location information of the first UE and location information of UEs to which transmission resources are currently already allocated, second UE that meets a preset condition, where the preset condition is that a distance between the second UE and the first UE is greater than a first preset distance; allocating, to the first UE, a transmission resource already allocated to the second UE; and sending the allocated transmission resource to the first UE.

According to a fifteenth aspect, user equipment is provided, and the user equipment includes a transmitter, a receiver, a memory, and a processor that is connected to the transmitter, the receiver, and the memory separately, where the memory stores a group of program code, and the processor is configured to invoke the program code stored in the memory, so that the processor is configured to perform the following operations: sending a resource allocation request to a base station; sending location information of the user equipment to the base station, so that the base station allocates a transmission resource according to the location information of the user equipment and location information of UEs to which transmission resources are currently already allocated; and receiving the transmission resource allocated by the base station.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions provided by the embodiments of the present disclosure have the following beneficial effects: The UE listens to transmission resources provided by the base station, and therefore can learn of a transmission resource in an idle state and actively request the idle transmission resource from the base station. Therefore, the base station can learn, according to a report of the UE, the transmission resource that the UE can use currently, and can perform resource allocation based on the transmission resource reported by the UE. In this way, proper transmission resource allocation is implemented, and a transmission resource multiplex rate and a success rate of communication between vehicles in the Internet of Vehicles are increased.

Figure 1:
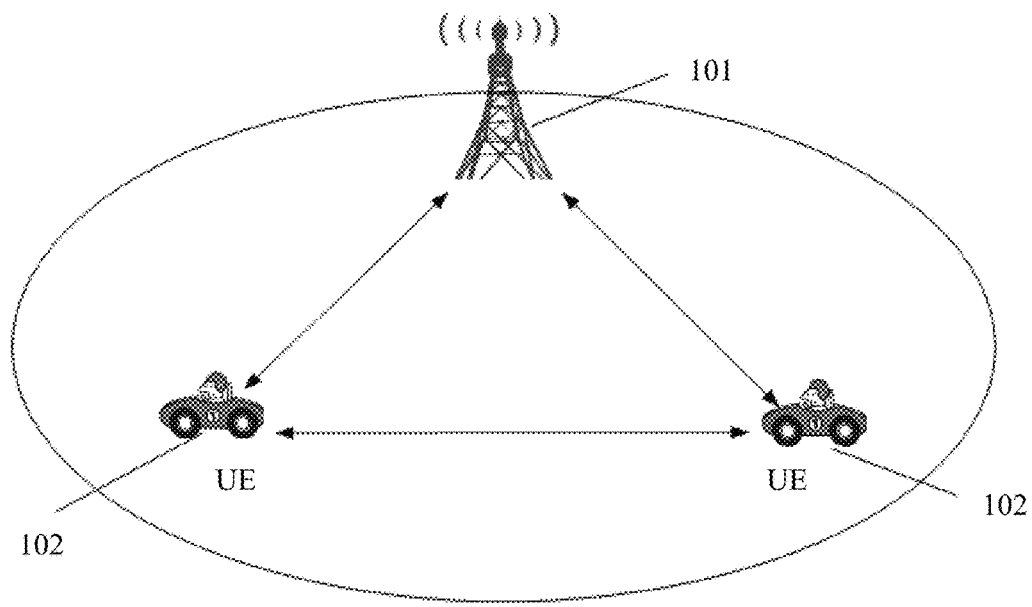
FIG. 1 is a schematic diagram of an implementation scenario used in a resource allocation method according to an embodiment of the present disclosure.

FIG. 1 is a schematic diagram of an implementation scenario used in a resource allocation method according to an aspect of the present disclosure. As shown in FIG. 1, the implementation scenario includes a base station 101 and at least one UE (User Equipment, user equipment) 102. The base station 101 has a radio resource management function, and may allocate a transmission resource to the UE, so that the UE can perform communication. The UE 102 includes but is not limited to a vehicle, a hand-held device in a vehicle, or the like. The UE 102 can not only communicate with the base station, but also communicate with another UE by using a transmission resource allocated by the base station to the UE 102.

Figure 2:
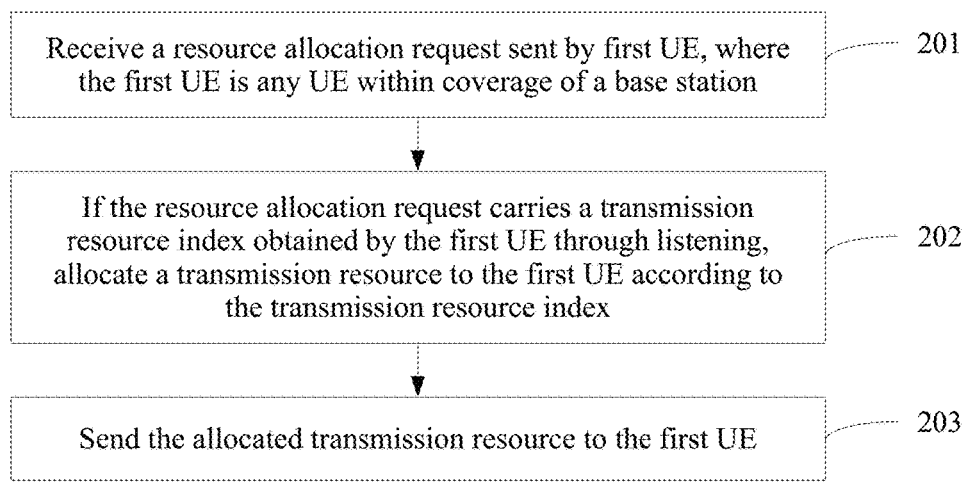
FIG. 2 is a flowchart of a resource allocation method according to an aspect of the present disclosure.

FIG. 2 is a flowchart of a resource allocation method according to an aspect of the present disclosure. This method may be performed by a base station. Referring to FIG. 2, the method may include the following steps.

201. Receive a resource allocation request sent by first UE, where the first UE is any UE within coverage of a base station.

202. If the resource allocation request carries a transmission resource index obtained by the first UE through listening, allocate a transmission resource to the first UE according to the transmission resource index.

203. Send the allocated transmission resource to the first UE.

In the method provided by this embodiment of the present disclosure, the UE listens to transmission resources provided by the base station, and therefore can learn of a transmission resource in an idle state and actively request the idle transmission resource from the base station, so that the base station performs resource allocation based on a report of the UE. In this way, proper transmission resource allocation is implemented, and a transmission resource multiplex rate and a success rate of communication between vehicles in the Internet of Vehicles are increased.

Optionally, before the receiving a resource allocation request sent by first UE, the method further includes:

sending listening setting information to the UE within the coverage of the base station, where the listening setting information is used to notify the UE of a duration of listening.

Optionally, the sending listening setting information to the UE within the coverage of the base station includes:

sending RRC signaling to the UE within the coverage of the base station, where the RRC signaling carries the listening setting information; or sending a SIB message to the UE within the coverage of the base station, where the SIB message carries the listening setting information; or sending control signaling to the UE within the coverage of the base station, where the control signaling carries the listening setting information.

Optionally, before the receiving a resource allocation request sent by first UE, the method further includes:

sending energy threshold information to the UE within the coverage of the base station, where the energy threshold information is used to notify the UE of a first energy threshold in listening.

Optionally, the sending energy threshold information to the UE within the coverage of the base station includes:

sending RRC signaling to the UE within the coverage of the base station, where the RRC signaling carries the energy threshold information; or sending a SIB message to the UE within the coverage of the base station, where the SIB message carries the energy threshold information; or sending control signaling to the UE within the coverage of the base station, where the control signaling carries the energy threshold information.

Optionally, before the receiving a resource allocation request sent by first UE, the method further includes:

sending quantity setting information to the UE within the coverage of the base station, where the quantity setting information is used to notify the UE of a quantity of transmission resource indexes to be carried when the resource allocation request is sent.

Optionally, after the receiving a resource allocation request sent by first UE, the method further includes:

if the resource allocation request does not carry any transmission resource index, allocating a transmission resource to the first UE according to an allocation status of the transmission resource of the base station; and if the base station has an unallocated transmission resource, allocating the unallocated transmission resource to the first UE; or if all transmission resources of the base station are already allocated, obtaining location information of the first UE;

determining, according to the location information of the first UE and location information of UEs to which transmission resources are currently already allocated, second UE that meets a preset condition, where the preset condition is that a distance between the second UE and the first UE is greater than a first preset distance; and allocating, to the first UE, a transmission resource already allocated to the second UE.

Optionally, the obtaining location information of the first UE includes:

receiving the location information of the first UE; or determining the location information of the first UE according to a transmit signal of the first UE; or using previously obtained location information of the first UE as current location information of the first UE.

Optionally, the receiving the location information sent by the first UE includes:

receiving GPS location information of the first UE; or receiving estimated location information of the first UE, where the estimated location information is location information obtained by the first UE through estimation according to a positioning reference signal transmitted by the base station; or receiving area index information of an area in which the first UE is currently located.

Optionally, the determining the location information of the first UE according to a transmit signal of the first UE includes:

determining a relative azimuth between the first UE and the base station according to the transmit signal of the first UE; and determining a distance between the first UE and the base station according to a detected energy value of the transmit signal of the first UE.

Optionally, the transmit signal of the first UE is:

a physical uplink control channel PUCCH signal; or the transmit signal of the first UE is a physical uplink shared channel PUSCH signal; or the transmit signal of the first UE is a RACH; or the transmit signal of the first UE is a PUCCH signal used to carry an SR; or the transmit signal of the first UE is a PUSCH signal used to carry a BSR; or the transmit signal of the first UE is a communication signal between the first UE and another UE.

Optionally, after the sending the allocated transmission resource to the first UE, the method further includes:

determining whether a resource collision exists between the first UE and the second UE; and when confirming that the resource collision exists between the first UE and the second UE, reallocating a transmission resource to the first UE or the second UE.

Optionally, after the sending the allocated transmission resource to the first UE, the method further includes:

sending a resource multiplex message to the first UE and the second UE separately, where the resource multiplex message is used to notify that the same transmission resource is allocated to the first UE and the second UE.

Optionally, the determining whether a resource collision exists between the first UE and the second UE includes:

determining, in real time according to the location information of the first UE and location information of the second UE, whether the distance between the first UE and the second UE is less than a second preset distance; and when confirming that the distance between the first UE and the second UE is less than the second preset distance, determining that the resource collision exists between the first UE and the second UE.

Optionally, the determining whether a resource collision exists between the first UE and the second UE includes:

when receiving a resource collision message sent by the first UE, determining that the resource collision exists between the first UE and the second UE, where the resource collision message is obtained by the first UE by performing detection on the transmission resource at a silent time; or when receiving a resource collision message sent by the second UE, determining that the resource collision exists between the first UE and the second UE, where the resource collision message is obtained by the second UE by performing detection on the transmission resource at a silent time.

Optionally, before the determining whether a resource collision exists between the first UE and the second UE, the method further includes:

sending silence setting information to the first UE and the second UE separately, where the silence setting information is used to instruct the UEs to keep silent in a specified transmission timeslot.

Optionally, the determining whether a resource collision exists between the first UE and the second UE includes:

when receiving a resource collision message sent by third UE, determining that the resource collision exists between the first UE and the second UE, where the third UE is UE different from the first UE and the second UE within the coverage of the base station, and the resource collision message is obtained by the third UE by performing detection on the transmission resource.

Optionally, before the determining whether a resource collision exists between the first UE and the second UE, the method further includes:

sending a broadcast message to the UE within the coverage of the base station, where the broadcast message carries a transmission resource index allocated to the first UE and the second UE, and the transmission resource index is used by the UE within the coverage of the base station to perform detection on the transmission resource.

All the foregoing optional technical solutions may be randomly combined to form optional embodiments of the present disclosure. Details are not described exhaustively herein.

Figure 3:
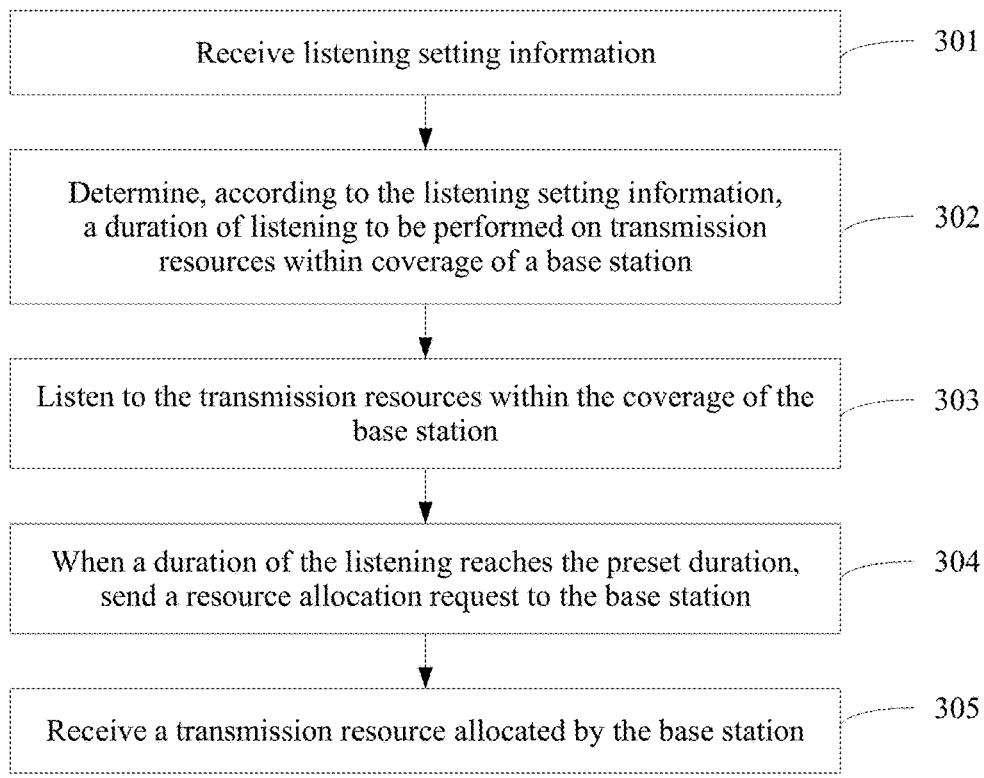
FIG. 3 is a flowchart of a resource allocation method according to an aspect of the present disclosure.

FIG. 3 is a flowchart of a resource allocation method according to an aspect of the present disclosure. This method may be performed by UE. Referring to FIG. 3, the method includes the following steps.

301. Receive listening setting information, where the listening setting information is used to notify UE of a duration of listening.

302. Determine, according to the listening setting information, a duration of listening to be performed on transmission resources within coverage of a base station.

303. Listen to the transmission resources within the coverage of the base station.

304. When a duration of the listening reaches the preset duration, send a resource allocation request to the base station, so that the base station allocates a transmission resource according to the resource allocation request.

305. Receive the transmission resource allocated by the base station.

Optionally, the listening to the transmission resources within the coverage of the base station includes:

performing energy detection on the transmission resource to obtain a detected energy value; and when the detected energy value is less than a first energy threshold, obtaining a transmission resource index of the transmission resource.

Optionally, the resource allocation request carries the transmission resource index of the transmission resource.

Optionally, before the listening to the transmission resources within the coverage of the base station, the method further includes:

receiving energy threshold information from the base station, where the energy threshold information is used to notify the UE of the first energy threshold in listening.

Optionally, before the sending a resource allocation request to the base station when a duration of the listening reaches the preset duration, the method further includes:

receiving quantity setting information sent by the base station, where the quantity setting information is used to notify the UE of a quantity of transmission resource indexes to be carried when the resource allocation request is sent; and determining, according to the quantity setting request, the quantity of transmission resource indexes to be carried in the resource allocation request.

Optionally, the method further includes: when determining that no transmission resource that is listened to is idle, sending location information of the user equipment to the base station.

Optionally, the sending location information of the user equipment to the base station includes:

sending GPS location information to the base station; or sending estimated location information to the base station, where the estimated location information is location information obtained by the user equipment through estimation according to a positioning reference signal transmitted by the base station; or sending area index information of an area in which the user equipment is currently located to the base station.

Optionally, after the receiving the transmission resource allocated by the base station, the method further includes:

receiving a resource multiplex message sent by the base station; and periodically sending location information of the user equipment to the base station, so that the base station determines, according to the location information of the user equipment, whether a resource collision exists.

Optionally, after the receiving the transmission resource allocated by the base station, the method further includes:

receiving silence setting information sent by the base station, where the silence setting information is used to instruct the UE to keep silent in a specified transmission timeslot;

keeping silent in the specified transmission timeslot according to the silence setting information;

when detecting that a detected energy value of the transmission resource occupied by the user equipment in the specified transmission timeslot is greater than a second energy threshold, determining that a resource collision exists;

when determining that the resource collision exists, generating a resource collision message; and sending the resource collision message to the base station.

All the foregoing optional technical solutions may be randomly combined to form optional embodiments of the present disclosure. Details are not described exhaustively herein.

Figure 4:
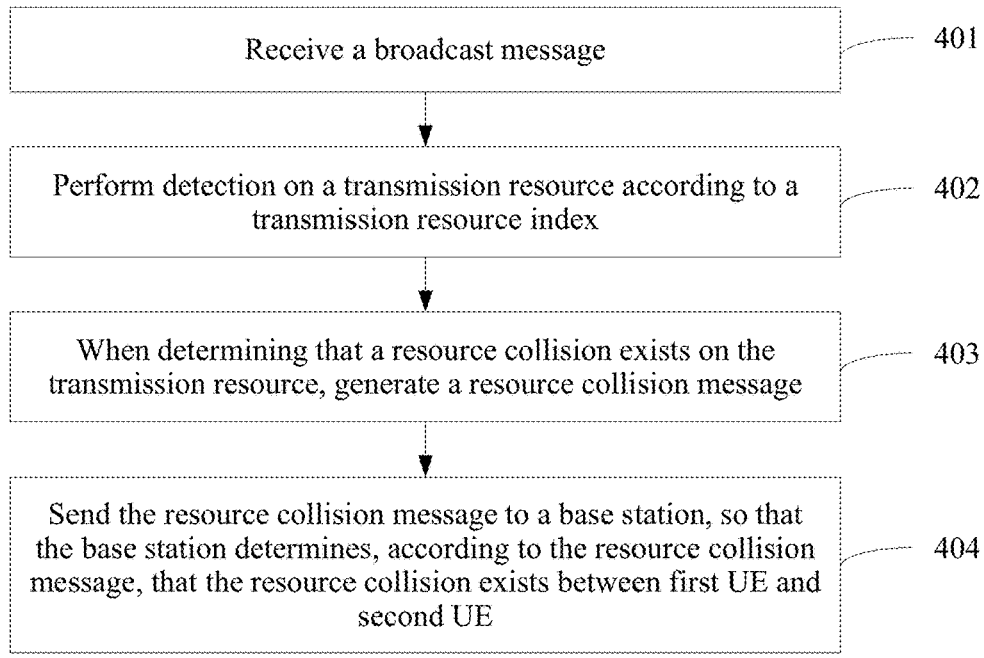
FIG. 4 is a flowchart of a resource allocation method according to an aspect of the present disclosure.

FIG. 4 is a flowchart of a resource allocation method according to an aspect of the present disclosure. This method is performed by UE. Referring to FIG. 4, the method includes the following steps.

401. Receive a broadcast message, where the broadcast message carries a transmission resource index allocated to first UE and second UE.

402. Perform detection on a transmission resource according to the transmission resource index.

403. When determining that a resource collision exists on the transmission resource, generate a resource collision message.

404. Send the resource collision message to a base station, so that the base station determines, according to the resource collision message, that the resource collision exists between the first UE and the second UE.

Optionally, the performing detection on a transmission resource according to the transmission resource index includes:

performing detection on the transmission resource corresponding to the transmission resource index; and if a signal is successfully detected on the transmission resource, but as the user equipment moves, a change range of signal energy on the transmission resource is less than a preset threshold, and no signal can be successfully detected on the transmission resource again, and still no signal can be successfully detected within a preset duration, determining that the resource collision exists between the first UE and the second UE.

All the foregoing optional technical solutions may be randomly combined to form optional embodiments of the present disclosure. Details are not described exhaustively herein.

Figure 5:
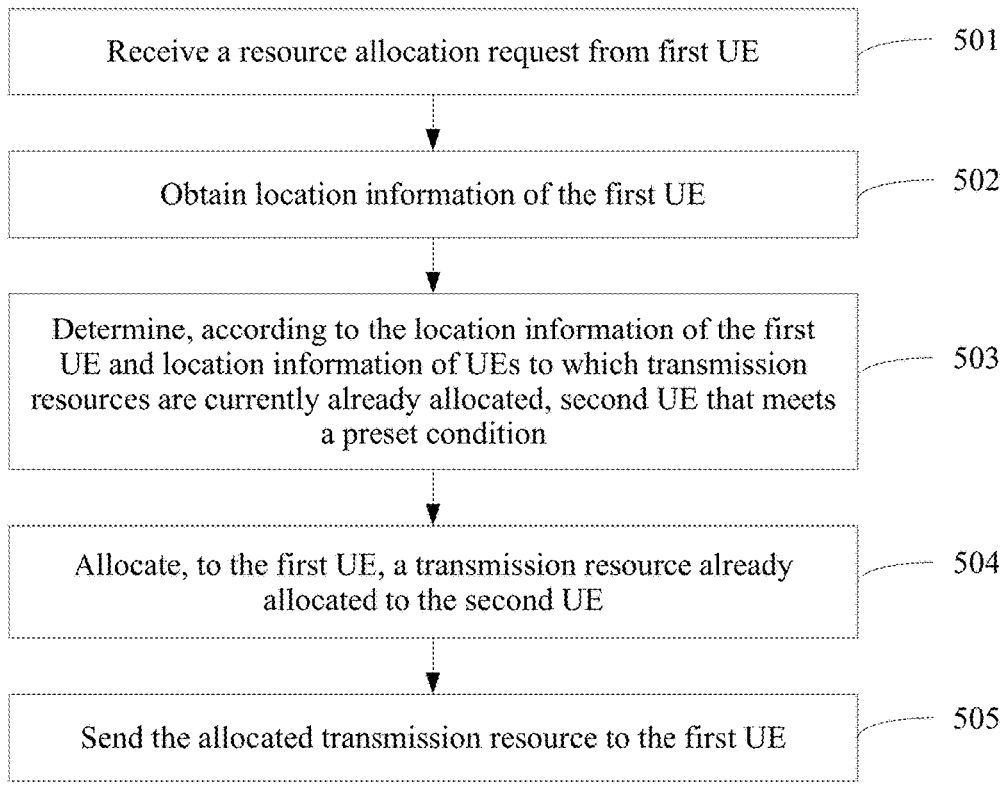
FIG. 5 is a flowchart of a resource allocation method according to an aspect of the present disclosure.

FIG. 5 is a flowchart of a resource allocation method according to an aspect of the present disclosure. Referring to FIG. 5, the method includes the following steps.

501. Receive a resource allocation request from first UE, where the first UE is any UE within coverage of a base station.

502. Obtain location information of the first UE.

503. Determine, according to the location information of the first UE and location information of UEs to which transmission resources are currently already allocated, second UE that meets a preset condition, where the preset condition is that a distance between the second UE and the first UE is greater than a first preset distance.

504. Allocate, to the first UE, a transmission resource already allocated to the second UE.

505. Send the allocated transmission resource to the first UE.

Optionally, the obtaining location information of the first UE includes:

receiving the location information of the first UE; or determining the location information of the first UE according to a transmit signal of the first UE; or using previously obtained location information of the first UE as current location information of the first UE.

Optionally, the receiving the location information sent by the first UE includes:

receiving GPS location information of the first UE; or receiving estimated location information of the first UE, where the estimated location information is location information obtained by the first UE through estimation according to a positioning reference signal transmitted by the base station; or receiving area index information of an area in which the first UE is currently located.

Optionally, the determining the location information of the first UE according to a transmit signal of the first UE includes:

determining a relative azimuth between the first UE and the base station according to the transmit signal of the first UE; and determining a distance between the first UE and the base station according to a detected energy value of the transmit signal of the first UE.

Optionally, the transmit signal of the first UE is:

a physical uplink control channel PUCCH signal; or a physical uplink shared channel PUSCH signal; or a random access channel RACH; or a PUCCH signal used to carry a scheduling request SR; or a PUSCH signal used to carry a buffer status report BSR; or a communication signal between the first UE and another UE.

Optionally, after the sending the allocated transmission resource to the first UE, the method further includes:

determining whether a resource collision exists between the first UE and the second UE; and when confirming that the resource collision exists between the first UE and the second UE, reallocating a transmission resource to the first UE or the second UE.

Optionally, after the sending the allocated transmission resource to the first UE, the method further includes:

sending a resource multiplex message to the first UE and the second UE separately, where the resource multiplex message is used to notify that the same transmission resource is allocated to the first UE and the second UE.

Optionally, the determining whether a resource collision exists between the first UE and the second UE includes:

determining, in real time according to the location information of the first UE and location information of the second UE, whether the distance between the first UE and the second UE is less than a second preset distance; and when confirming that the distance between the first UE and the second UE is less than the second preset distance, determining that the resource collision exists between the first UE and the second UE.

Optionally, the determining whether a resource collision exists between the first UE and the second UE includes:

when receiving a resource collision message sent by the first UE, determining that the resource collision exists between the first UE and the second UE, where the resource collision message is obtained by the first UE by performing detection on the transmission resource at a silent time; or when receiving a resource collision message sent by the second UE, determining that the resource collision exists between the first UE and the second UE, where the resource collision message is obtained by the second UE by performing detection on the transmission resource at a silent time.

Optionally, before the determining whether a resource collision exists between the first UE and the second UE, the method further includes:

sending silence setting information to the first UE and the second UE separately, where the silence setting information is used to instruct the UEs to keep silent in a specified transmission timeslot.

Optionally, the determining whether a resource collision exists between the first UE and the second UE includes:

when receiving a resource collision message sent by third UE, determining that the resource collision exists between the first UE and the second UE, where the third UE is UE different from the first UE and the second UE within the coverage of the base station, and the resource collision message is obtained by the third UE by performing detection on the transmission resource.

Optionally, before the determining whether a resource collision exists between the first UE and the second UE, the method further includes:

sending a broadcast message to the UE within the coverage of the base station, where the broadcast message carries a transmission resource index allocated to the first UE and the second UE, and the transmission resource index is used by the UE within the coverage of the base station to perform detection on the transmission resource.

All the foregoing optional technical solutions may be randomly combined to form optional embodiments of the present disclosure. Details are not described exhaustively herein.

Figure 6:
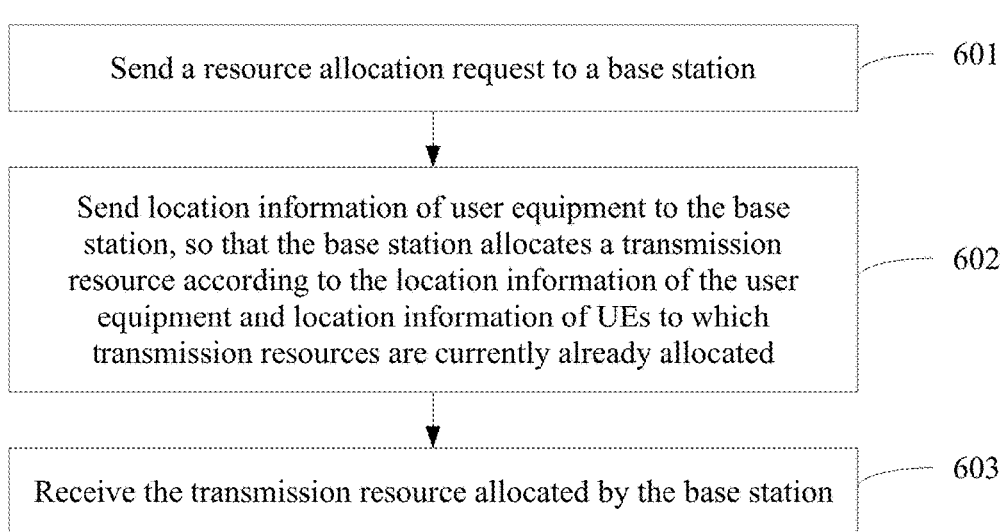
FIG. 6 is a flowchart of a resource allocation method according to an aspect of the present disclosure.

FIG. 6 is a flowchart of a resource allocation method according to an aspect of the present disclosure. Referring to FIG. 6, the method includes the following steps.

601. Send a resource allocation request to a base station.

602. Send location information of user equipment to the base station, so that the base station allocates a transmission resource according to the location information of the user equipment and location information of UEs to which transmission resources are currently already allocated.

603. Receive the transmission resource allocated by the base station.

Optionally, the sending location information of user equipment to the base station includes:

sending GPS location information to the base station; or sending estimated location information to the base station, where the estimated location information is location information obtained by the user equipment through estimation according to a positioning reference signal transmitted by the base station; or sending area index information of an area in which the user equipment is currently located to the base station.

Optionally, after the receiving the transmission resource allocated by the base station, the method further includes:

receiving a resource multiplex message sent by the base station; and periodically sending the location information of the user equipment to the base station, so that the base station determines, according to the location information of the user equipment, whether a resource collision exists.

Optionally, after the receiving the transmission resource allocated by the base station, the method further includes:

receiving silence setting information sent by the base station, where the silence setting information is used to instruct the UE to keep silent in a specified transmission timeslot;

keeping silent in the specified transmission timeslot according to the silence setting information;

when detecting that a detected energy value of the transmission resource occupied by the user equipment in the specified transmission timeslot is greater than a second energy threshold, determining that a resource collision exists;

when determining that the resource collision exists, generating a resource collision message; and sending the resource collision message to the base station.

All the foregoing optional technical solutions may be randomly combined to form optional embodiments of the present disclosure. Details are not described exhaustively herein.

Figure 7:
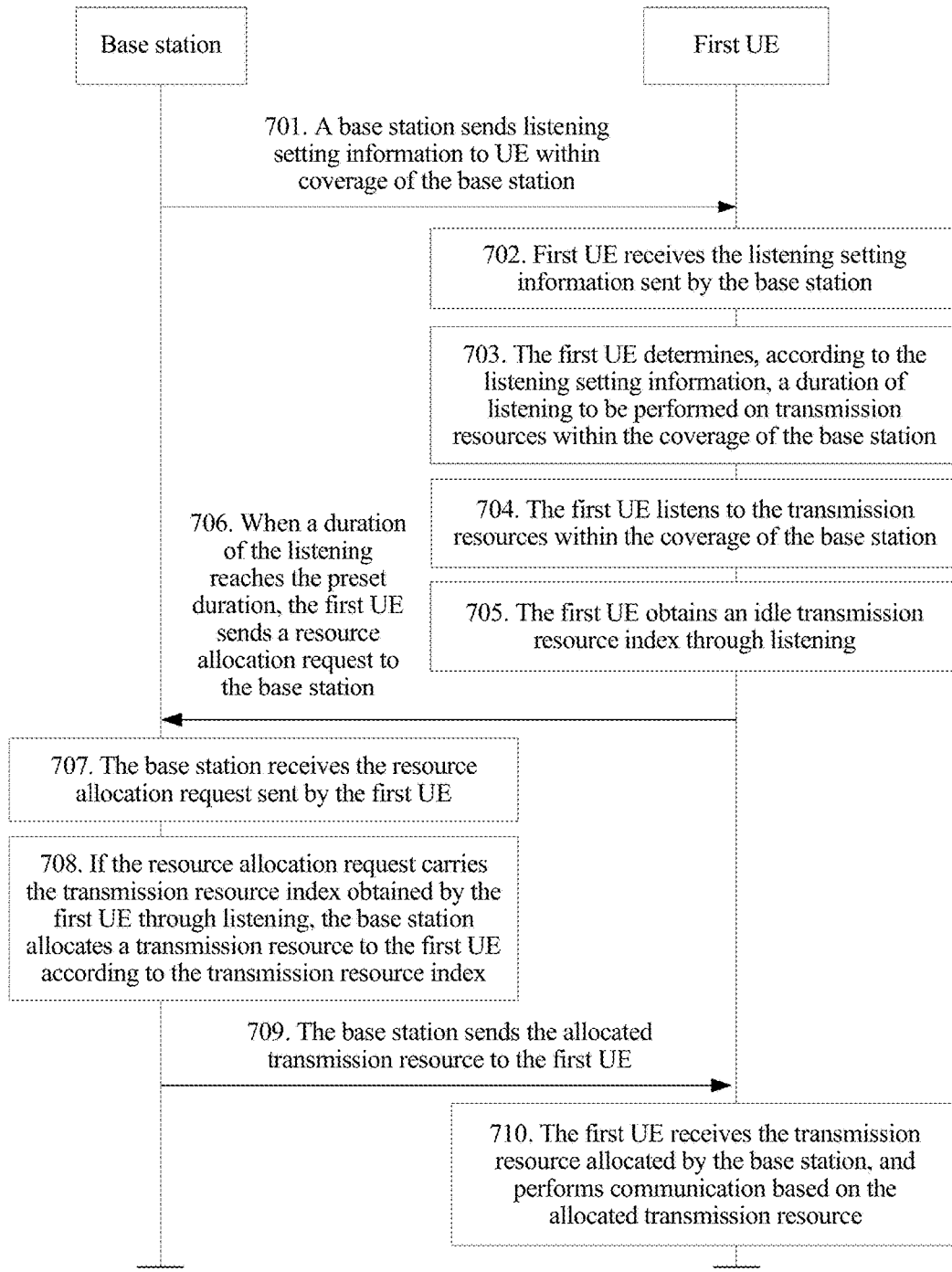
FIG. 7 is a flowchart of a resource allocation method according to an aspect of the present disclosure.

With reference to the schematic diagram of the implementation scenario shown in FIG. 1 and content in the foregoing embodiments, FIG. 7 is a flowchart of a resource allocation method according to an aspect of the present disclosure. Referring to FIG. 7, the method includes the following steps.

701. A base station sends listening setting information to UE within coverage of the base station, where the listening setting information is used to notify the UE of a duration of listening.

Optionally, due to mobility of the UE and possible instability of a communication signal between the UE and the base station, the UE may not successfully receive the listening setting information sent by the base station. Therefore, in an optional implementation of this embodiment of the present disclosure, to ensure that all UEs within the coverage of the base station can successfully receive the listening setting information sent by the base station, the base station may set a transmission period, and periodically send the listening setting information to the UEs within the coverage of the base station, so that all the UEs within the coverage of the base station can receive the listening setting information.

The listening setting information may be sent in multiple forms, for example, may be sent by using RRC (Radio Resource Control, radio resource control protocol) signaling, a SIB (System Information Block, system information block) message, or control signaling. Specifically, the sending process may include: the base station sends RRC signaling to the UE within the coverage of the base station, where the RRC signaling carries the listening setting information; or the base station sends a SIB message to the UE within the coverage of the base station, where the SIB message carries the listening mode information; or the base station sends control signaling to the UE within the coverage of the base station, where the control signaling carries the listening setting information.

702. First UE receives the listening setting information sent by the base station.

This embodiment of the present disclosure is described by using an example in which the duration of listening is set by the base station. In an actual scenario, the duration of listening not only may be set by the base station, but also may be a duration predefined on the user equipment. The predefined duration may be a fixed value specified on the first UE by a manufacturer before the first UE is delivered. Certainly, the duration may also be set by a user. The UE may provide a function of setting the duration by the user, and the user enters the preset duration on the UE. For example, the user may enter 10 ms, 20 ms, or the like. This is not limited in this embodiment of the present disclosure. When the UE detects the duration entered by the user, the UE sets the duration entered by the user as a duration of listening to a transmission resource.

In some embodiments of the present disclosure, different durations of listening may be set according to requirements of the UE on communication quality. For example, when the UE has a large amount of data to be transmitted and requires a large quantity of idle transmission resources, the duration may be set to a larger value, so that the UE listens to transmission resources for a longer time, and further obtains more idle transmission resources through listening. When the UE has no special requirement on the quantity of idle transmission resources that are listened to or the UE has a high requires a short delay, the duration may also be set to a smaller value, so that the listening can be completed in time and that the transmission resources can be obtained as soon as possible.

703. The first UE determines, according to the listening setting information, a duration of listening to be performed on transmission resources within the coverage of the base station.

When the first UE receives the listening setting information sent by the base station, the duration carried in the information is used as the duration of listening to be performed by the first UE on the transmission resources.

704. The first UE listens to the transmission resources within the coverage of the base station.

In some embodiments of the present disclosure, the listening may be performing energy detection on a transmission resource. If a communication signal of UE exists on the transmission resource, and the UE is close to the first UE, a detected energy value of the transmission resource is relatively large. When no communication signal of UE exists on the transmission resource, or a communication signal of UE exists on the transmission resource and the UE is far away from the first UE, a detected energy value of the transmission resource is relatively small. Therefore, in this embodiment of the present disclosure, energy detection is performed on the transmission resource, and whether the transmission resource is idle is determined, according to the detected energy value. Specifically, that the first UE listens to the transmission resources within the coverage of the base station includes: the first UE performs energy detection on a transmission resource to obtain a detected energy value; when the detected energy value is less than a first energy threshold, the transmission resource is considered as idle, and the first UE obtains a transmission resource index of the idle transmission resource; and when a duration of listening to the transmission resource by the first UE reaches the preset duration, the first UE stops listening to the transmission resource.

The first energy threshold may be set by the base station. In this case, before step 704, the method may further include: the base station sends energy threshold information to the UE within the coverage of the base station, where the energy threshold information is used to notify the UE of the first energy threshold in listening. When the UE receives the energy threshold information, the UE sets the user equipment itself according to the first energy threshold. Certainly, in an actual scenario, the first energy threshold not only may be set by the base station, but also may be a first energy threshold predefined on the user equipment. A source of the first energy threshold is not specifically limited in this embodiment of the present disclosure.

It should be noted that, the energy threshold information may be sent in multiple forms, for example, may be sent by using RRC signaling, a SIB message, or control signaling. Specifically, the sending process may include: sending RRC signaling to the UE within the coverage of the base station, where the RRC signaling carries the energy threshold information; or sending a SIB message to the UE within the coverage of the base station, where the SIB message carries the energy threshold information; or sending control signaling to the UE within the coverage of the base station, where the control signaling carries the energy threshold information.

Because there may be multiple transmission resources within the coverage of the base station, in an actual listening process, a poll manner may be used to listen to different transmission resources, or a parallel manner may be used to listen to different transmission resources.

705. The first UE obtains an idle transmission resource index through listening.

The idle transmission resource index is used to identify an idle transmission resource obtained by the first UE through listening. This embodiment of the present disclosure is described by using an example in which an idle transmission resource is obtained through listening. However, in an actual scenario, the first UE possibly cannot obtain any idle transmission resource through listening, and therefore cannot obtain any idle transmission resource index. In this case, a resource allocation request sent to the base station may not carry any transmission resource index, so that the base station learns a current requirement of the first UE.

Further, multiple idle transmission resources may be obtained by the first UE through listening. In this case, to avoid resource waste and reduce signaling load, the base station may further send quantity setting information to the UE within the coverage of the base station, where the quantity setting information is used to notify the UE of a quantity of transmission resource indexes to be carried when the resource allocation request is sent. When the UE receives the quantity setting information, the UE sets, according to the quantity carried in the quantity setting information, a quantity of transmission resource indexes to be carried when the resource allocation request is sent.

Specifically, when the quantity of idle transmission resources that are obtained by the first UE through listening is greater than the quantity of transmission resource indexes carried in the quantity setting information, the resource allocation request carries the quantity specified in the quantity setting information. When the quantity of idle transmission resources that are obtained by the first UE through listening is less than the quantity of transmission resource indexes carried in the quantity setting information, the resource allocation request carries all idle transmission resource indexes that are obtained by the UE through listening. For example, when the quantity of idle transmission resources that are obtained by the first UE through listening is 8, and the quantity of transmission resource indexes carried in the quantity setting information is 5, the resource allocation request carries five transmission resource indexes; when the quantity of idle transmission resources that are obtained by the first UE through listening is 8, and the quantity of transmission resource indexes carried in the quantity setting information is 10, the resource allocation request carries eight transmission resource indexes.

In addition, when the first UE obtains the idle transmission resources through listening, in another embodiment of the present disclosure, the idle transmission resource indexes may be further sorted in ascending order of detected energy values of the idle transmission resources, and the resource allocation request carries sorted idle transmission resource indexes. Certainly, when the quantity of idle transmission resources that are obtained by the first UE through listening is greater than the quantity of transmission resource indexes carried in the quantity setting information, a quantity of idle transmission resource indexes equal to the quantity of transmission resource indexes carried in the quantity setting information may be obtained according to a sequence of sorted detected energy values. Due to factors such as a distance between UEs, an idle transmission resource obtained by the UE through listening is not always actually idle; instead, when a detected energy value is smaller, a possibility that the transmission resource is an idle resource is higher. Therefore, an idle transmission resource with a smaller detected energy value is reported to the base station, so that the base station performs resource allocation for the first UE. This can increase an allocation success rate greatly.

706. When a duration of the listening reaches the preset duration, the first UE sends a resource allocation request to the base station, where the resource allocation request carries the idle transmission resource index obtained by the first UE through listening.

This embodiment of the present disclosure is described by using an example in which the resource allocation request carries the idle transmission resource index obtained by the first UE through listening.

707. The base station receives the resource allocation request sent by the first UE.

708. If the resource allocation request carries the transmission resource index obtained by the first UE through listening, the base station allocates a transmission resource to the first UE according to the transmission resource index.

The transmission resource corresponding to the transmission resource index may be an idle transmission resource or a transmission resource that is already allocated. If the transmission resource is already allocated, because there is a long distance between UE that is allocated the transmission resource and the first UE, communication thereof is not mutually affected. Therefore, the transmission resource corresponding to the transmission resource index may be directly allocated to the first UE.

709. The base station sends the allocated transmission resource to the first UE.

710. The first UE receives the transmission resource allocated by the base station, and performs communication based on the allocated transmission resource.

Based on the allocated transmission resource, the first UE may send a vehicle-to-vehicle communication signal to another UE or send a signal to the base station. This process is not specifically limited in this embodiment of the present disclosure.

In the method provided by this embodiment of the present disclosure, the UE listens to transmission resources provided by the base station, and therefore can learn of a transmission resource in an idle state and actively request the idle transmission resource from the base station, so that the base station performs resource allocation based on a report of the UE. In this way, proper transmission resource allocation is implemented, and a transmission resource multiplex rate and a success rate of communication between vehicles in the Internet of Vehicles are increased.

Figure 8:
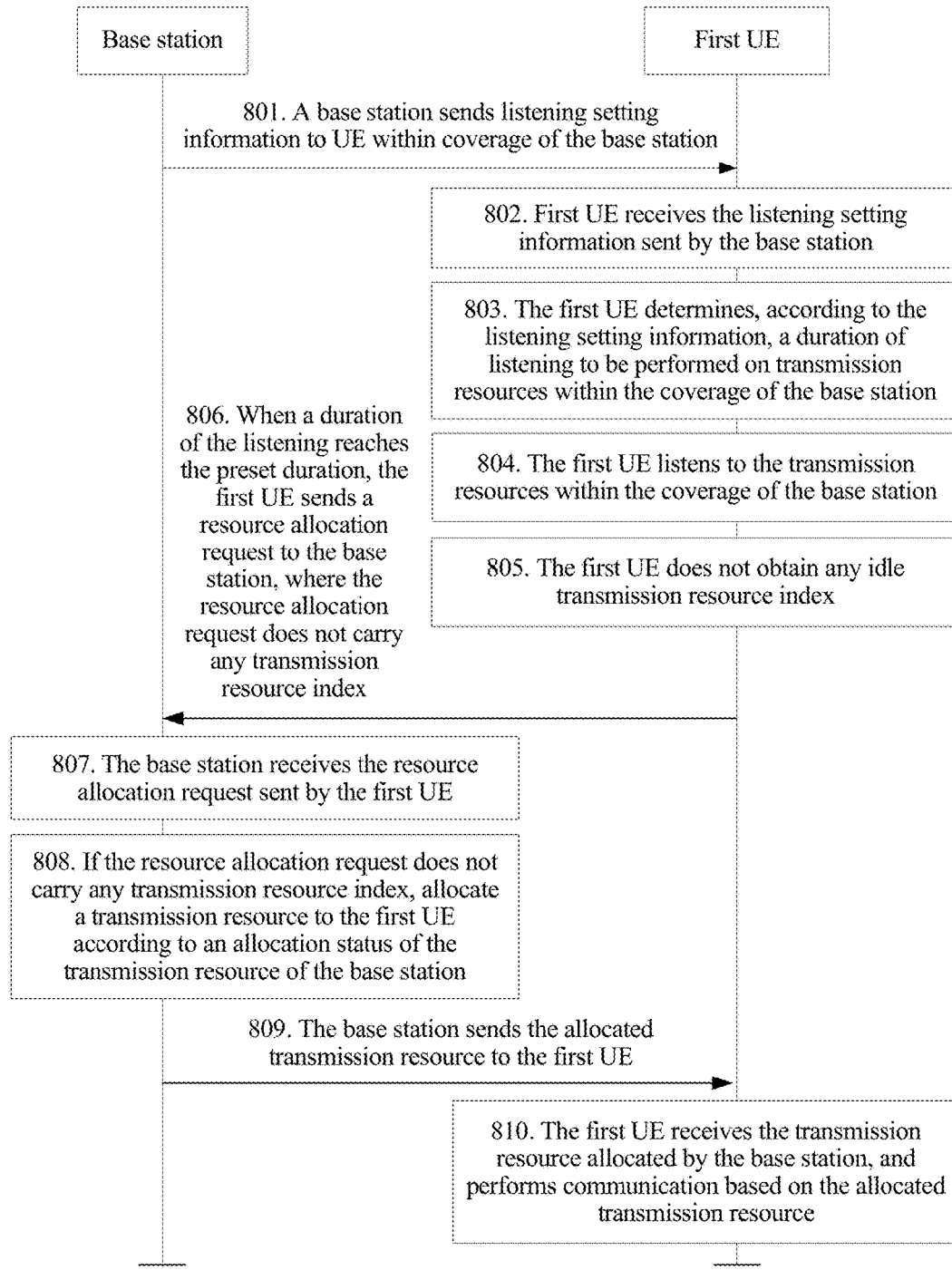
FIG. 8 is a flowchart of a resource allocation method according to an aspect of the present disclosure.

FIG. 7 is described by using an example in which the first UE obtains an idle transmission resource through listening. However, in an actual scenario, the first UE possibly cannot obtain any idle transmission resource through listening. To implement vehicle-to-vehicle communication and increase a resource multiplex rate, an embodiment of the present disclosure further provides another possible implementation. Referring to FIG. 8, the implementation specifically includes the following steps.

801. A base station sends listening setting information to UE within coverage of the base station, where the listening setting information is used to notify the UE of a duration of listening.

802. First UE receives the listening setting information sent by the base station.

803. The first UE determines, according to the listening setting information, a duration of listening to be performed on transmission resources within the coverage of the base station.

804. The first UE listens to the transmission resources within the coverage of the base station.

The foregoing steps 801 to 804 are the same as steps 701 to 704, and are not described again herein.

805. The first UE does not obtain any idle transmission resource index through listening.

806. When a duration of the listening reaches the preset duration, the first UE sends a resource allocation request to the base station, where the resource allocation request does not carry any transmission resource index.

807. The base station receives the resource allocation request sent by the first UE.

808. If the resource allocation request does not carry any transmission resource index, the base station allocate a transmission resource to the first UE according to an allocation status of the transmission resource of the base station.

Specifically, the process includes steps 808A to 808E.

808A. Determine whether the base station has any unallocated transmission resource, and if yes, perform step 808B, or if not, perform step 808C.

The base station stores allocation statuses of transmission resources according to resource allocation of the base station, for example, which transmission resource is already allocated and which UE is allocated the transmission resource. Therefore, the base station may learn, by querying the allocation statuses of the transmission resources of the base station, whether the base station currently has any transmission resource that may be allocated.

808B. If the base station has an unallocated transmission resource, allocate the unallocated transmission resource to the first UE.

In this embodiment of the present disclosure, the base station may randomly allocate any unallocated transmission resource to the first UE according to a transmission resource index carried in the resource allocation request. A manner of allocating a transmission resource to the first UE by the base station is not limited in this embodiment of the present disclosure.

808C. If all transmission resources of the base station are already allocated, obtain location information of the first UE.

The obtaining location information of the first UE in step 808C may be implemented in any one of the following three possible implementations:

First possible implementation: receiving the location information of the first UE.

Specifically, the receiving the location information of the first UE may include three possible implementations: (1) Receiving GPS location information of the first UE. UE equipped with a GPS positioning system may obtain GPS location information by using the GPS positioning system, and send the GPS location information to the base station, so that the base station receives the GPS location information of the UE. (2) Receiving estimated location information of the first UE, where the estimated location information is location information obtained by the first UE through estimation according to a positioning reference signal transmitted by the base station. Some UEs that are not equipped with a positioning system may estimate location information of the UEs according to positioning reference signals received by the UEs to obtain estimated location information, and send the estimated location information to the base station, so that the base station receives the estimated location information of the UEs. (3) Receiving current area index information of the first UE. In an actual scenario, a manner of reporting a location implicitly may also be used. For example, the base station divides the coverage of the base station into multiple areas according to geographical locations, and the areas correspond to different area index information. A terminal in an area can determine, according to a current status of the terminal, such as location information (GPS location information or estimated location information or the like) of the terminal, the area in which the terminal is located, and therefore send area index information of the corresponding area to the base station, so that after the base station receives the area index information, the base station determines current location information of the UE according to an area index.

Second possible implementation: determining the location information of the first UE according to a transmit signal of the first UE.

In this embodiment of the present disclosure, the transmit signal of the first UE may be an SRS (Sounding Reference Signal, sounding reference signal), a RACH (Random Access Channel, random access channel), a PUCCH (Physical Uplink Control Channel, physical uplink control channel), a PUSCH (Physical Uplink Share Channel, physical uplink shared channel), a physical uplink control channel PUCCH signal used to carry an SR (Scheduling Request, scheduling request), a physical uplink shared channel PUSCH channel used to carry a BSR (Buffer Status Report, buffer status report), or a communication signal between the first UE and another UE. If currently there is service transmission between the first UE and the base station, the location information of the first UE may be determined according to the PUCCH signal, the PUSCH signal, the SRS signal, or the like. However, if the first UE requests a resource for vehicle-to-vehicle communication by using the SR request in this case, the location information of the first UE may be determined by using the physical uplink control channel PUCCH signal used to carry the SR, the physical uplink shared channel PUSCH channel used to carry the BSR, or the like. However, if the base station can receive a communication signal in vehicle-to-vehicle communication, the location information of the first UE may be determined by using the communication signal between the first UE and the another UE.

Specifically, the second possible implementation includes: determining a relative azimuth between the first UE and the base station according to the transmit signal of the first UE; and determining a distance between the first UE and the base station according to a detected energy value of the transmit signal of the first UE. Specifically, the base station may determine the relative azimuth between the first UE and the base station according to the transmit signal of the first UE, for example, determine, according to the transmit signal of the first UE, that the first UE is on an east side of the base station. The base station determines the distance between the first UE and the base station according to the detected energy value of the transmit signal of the first UE. For example, the base station determines, according to the detected energy value of the transmit signal of the first UE, that the first UE is 500 meters away from the base station. The location information of the first UE is determined according to the relative azimuth between the first UE and the base station and the distance between the first UE and the base station that are determined by the base station.

In a vehicle-to-vehicle communication process, the UE may send status information of the UE to another UE, and the status information may include information such as a location, a driving direction, and a driving speed of a vehicle. However, because a broadcast form is used for transmission in vehicle-to-vehicle communication, the base station may also successfully receive a communication signal in vehicle-to-vehicle communication, and parse the communication signal to determine the location information of the UE.

Third possible implementation: using previously obtained location information of the first UE as current location information of the first UE.

Certainly, to save computing resources, the previously obtained location information of the first UE may also be used as the current location information of the first UE.

808D. Determine, according to the location information of the first UE and location information of UEs to which transmission resources are currently already allocated, second UE that meets a preset condition, where the preset condition is that a distance between the second UE and the first UE is greater than a first preset distance.

808E. Allocate, to the first UE, a transmission resource already allocated to the second UE.

A method for obtaining the location information of the other UEs may be the same as the method for obtaining the location information of the first UE, and is not described again herein.

To increase a resource multiplex rate while ensuring communication quality, during resource allocation, a search for the second UE according to the obtained location information of the first UE may be performed among the UEs to which transmission resources are currently already allocated. When a distance between UEs is greater than the first preset distance, impact on communication quality of the UEs is minimized. Therefore, the transmission resource allocated to the second UE may be allocated to the first UE. The first preset distance may be preset by the base station. For example, when a transmission distance in vehicle-to-vehicle communication is 300 meters, the base station may allocate, according to location information of UEs, a same transmission resource to two UEs that are 600 meters away from each other, where the distance is at least twice the vehicle-to-vehicle transmission distance. In this case, problems such as a transmission collision and a hidden node do not exist between the two vehicles.

809. The base station sends the allocated transmission resource to the first UE.

810. The first UE receives the transmission resource allocated by the base station, and performs communication based on the allocated transmission resource.

The steps 809 and 810 are the same as steps 709 and 710, and are not described again herein.

In the method provided by this embodiment of the present disclosure, the UE listens to transmission resources provided by the base station, and therefore can learn of a transmission resource in an idle state and actively request the idle transmission resource from the base station, so that the base station performs resource allocation based on a report of the UE. In this way, proper transmission resource allocation is implemented, and a transmission resource multiplex rate and a success rate of communication between vehicles in the Internet of Vehicles are increased. Further, even if the resource obtained through listening is not an actually idle transmission resource, resource allocation may be still performed, according to a distance between UEs, for the UE that currently requests the resource. Therefore, the transmission resource multiplex rate is increased without affecting communication of another UE.

Figure 9:
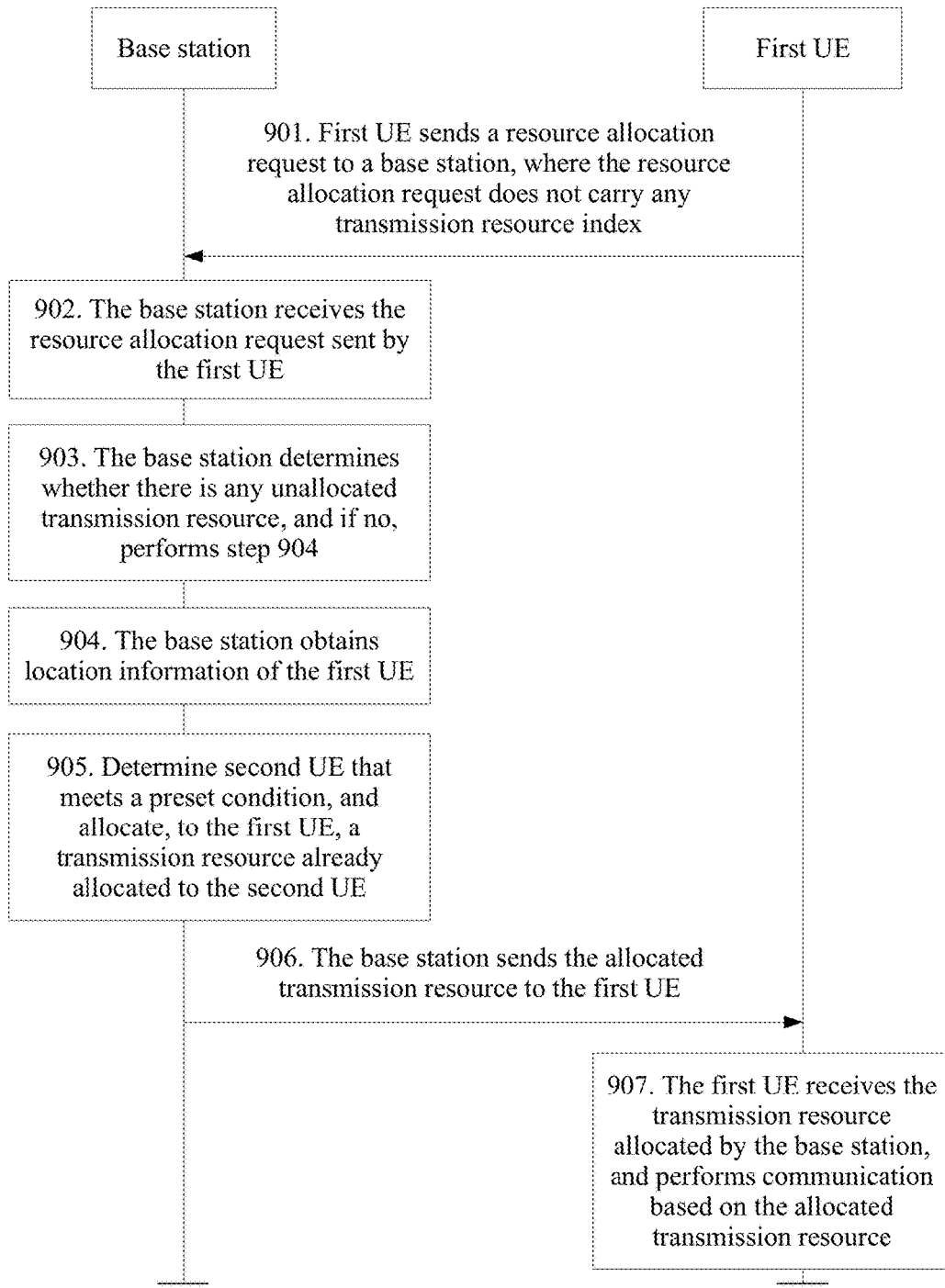
FIG. 9 is a flowchart of a resource allocation method according to an aspect of the present disclosure.

FIG. 7 and FIG. 8 illustrate an example in which the first UE performs listening. However, in an actual scenario, a listening process may also not be started; instead, resource allocation is performed for the first UE directly based on the location information of the first UE. Correspondingly, an embodiment of the present disclosure further provides another possible implementation. Referring to FIG. 9, the implementation specifically includes the following steps.

901. First UE sends a resource allocation request to a base station, where the resource allocation request does not carry any transmission resource index.

This embodiment of the present disclosure is described by using an example in which the UE does not perform a listening process.

902. The base station receives the resource allocation request sent by the first UE.

903. The base station determines whether there is any unallocated transmission resource, and if no, performs step 904.

In another implementation of this embodiment of the present disclosure, if the base station has an unallocated transmission resource, the unallocated transmission resource is allocated to the first UE.

904. The base station obtains location information of the first UE.

When the resource allocation request does not carry any transmission resource index, it indicates that the first UE does not perform resource listening, or performs resource listening but does not obtain any idle transmission resource through listening. In this case, to ensure a communication success rate of the first UE and increase a resource multiplex rate, resource allocation may be performed for the first UE according to the location information of the first UE.

The process of obtaining the location information of the first UE is the same as the foregoing step 808C, and is not described again herein.

905. Determine, according to the location information of the first UE and location information of UEs to which transmission resources are currently already allocated, second UE that meets a preset condition, where the preset condition is that a distance between the second UE and the first UE is greater than a first preset distance; and allocate, to the first UE, a transmission resource already allocated to the second UE.

That the base station allocates a transmission resource to the first UE includes two cases. In the first case, the base station has an idle transmission resource, and the base station allocates the available idle resource to the first UE. In the second case, all transmission resources of the base station are occupied, and the base station allocates, to the first UE according to the location information of the first UE and the location information of the UEs to which transmission resources are currently already allocated, the transmission resource already allocated to the second UE, where the distance between the second UE and the first UE is greater than the first preset distance.

The step 905 is the same as step 808D, and is not described again herein.

906. The base station sends the allocated transmission resource to the first UE.

907. The first UE receives the transmission resource allocated by the base station, and performs communication based on the allocated transmission resource.

The steps 906 and 907 are the same as steps 709 and 710, and are not described again herein.

In the method provided by this embodiment of the present disclosure, a distance between UEs is determined according to location information of the UEs. Therefore, a same transmission resource may be allocated to UEs that have a distance greater than the first preset distance. Therefore, resource multiplex is implemented, and a transmission resource multiplex rate is increased without affecting communication between UEs.

Figure 10:
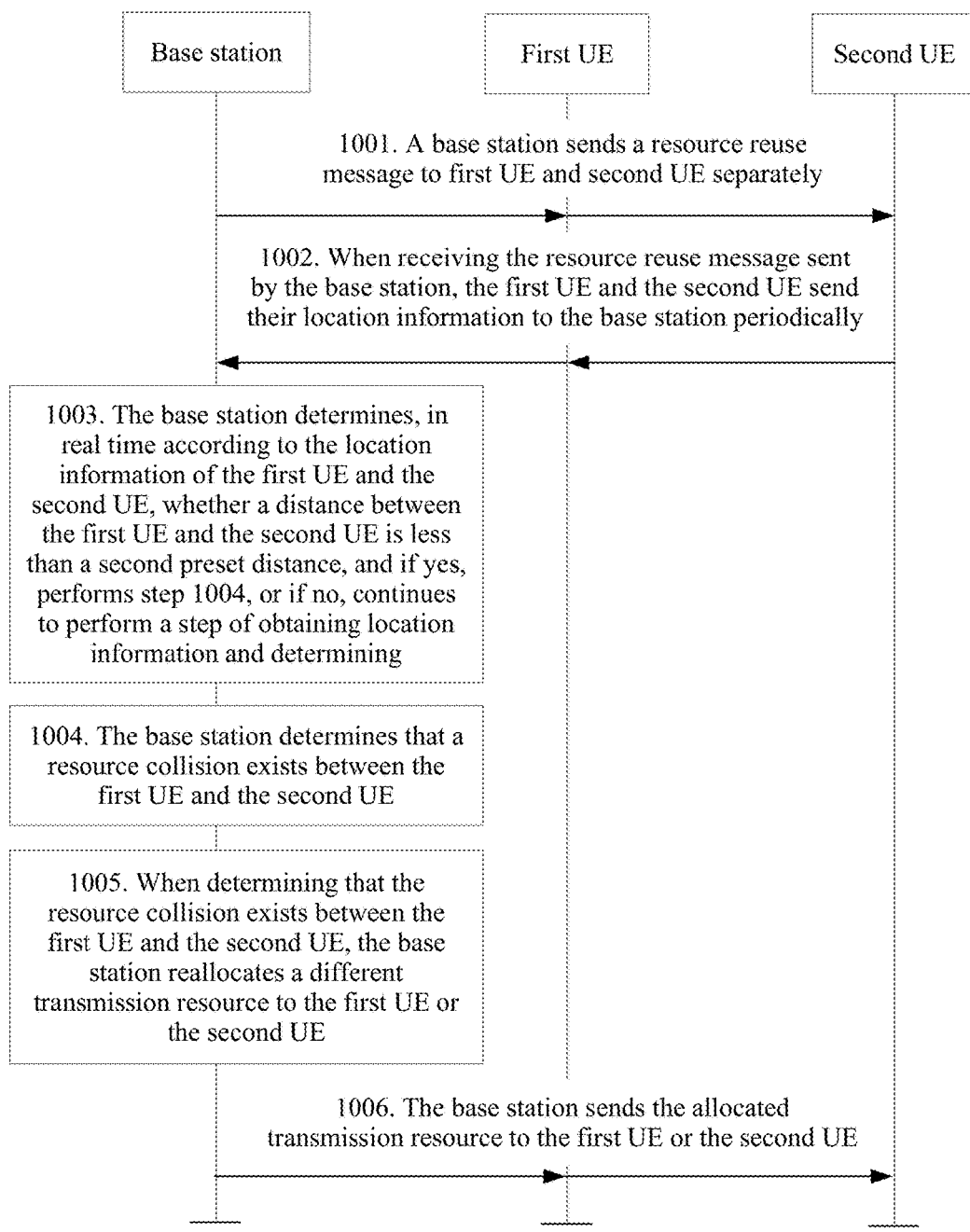
FIG. 10 is a flowchart of a resource allocation method according to an aspect of the present disclosure.

Further, the foregoing embodiments shown in FIG. 8 to FIG. 10 are all described by using an example about how to allocate a transmission resource, but after multiplex of the transmission resource, a communication success rate needs to be further increased, that is, a resource collision needs to be avoided. Therefore, on a basis of the foregoing embodiments, that is, on a basis of allocating the same transmission resource to the first UE and the second UE, an embodiment of the present disclosure further provides a collision detection method. Referring to FIG. 10, the collision detection method includes the following steps.

1001. A base station sends a resource multiplex message to first UE and second UE separately, where the resource multiplex message is used to notify that a same transmission resource is allocated to the first UE and the second UE.

The base station may trigger, by sending the resource multiplex message, the first UE and the second UE to periodically send their location information to the base station, so that the base station determines, according to the location information of the first UE and the second UE, whether a resource collision exists.

1002. When receiving the resource multiplex message sent by the base station, the first UE and the second UE send their location information to the base station periodically.

The sending process may be the same as sending the location information of the UE by the UE, and is not described again herein.

1003. The base station determines, in real time according to the location information of the first UE and the second UE, whether a distance between the first UE and the second UE is less than a second preset distance, and if yes, performs step 1004, or if no, continues to perform a step of obtaining location information and determining. The second preset distance may be set by the base station.

1004. When confirming that the distance between the first UE and the second UE is less than the second preset distance, the base station determines that a resource collision exists between the first UE and the second UE.

The second preset distance is less than or equal to a first preset distance. When the distance between the UEs is less than the second preset distance, it may be considered that communication quality of the UEs is affected. In this case, it may be determined that the resource collision exists between the first UE and the second UE.

The foregoing steps 1001 and 1002 are described by using an example in which the base station determines, according to the location information sent by the first UE and the second UE, whether the resource collision exists. In an actual scenario, the present disclosure further provides two other possible implementations for determining whether the resource collision exists:

First possible implementation: when receiving a resource collision message sent by the first UE, determining that the resource collision exists between the first UE and the second UE, where the resource collision message is obtained by the first UE by performing detection on the transmission resource at a silent time.

It should be noted that, the UE may keep silent in a communication process according to a preset silent manner. Silence means that in a transmission timeslot, the UE does not send a signal or data, but receives a signal or data only. In this case, in a silent state, the UE may confirm, by listening to the transmission resource, whether the transmission resource is occupied. The preset silent manner may be set by the base station, predefined on the user equipment, or set by the user equipment. For example, the base station may send silence setting information to the first UE and the second UE separately, where the silence setting information is used to instruct the UEs to keep silent in a specified transmission timeslot. For example, the silence setting information may be used to instruct the UEs to keep silent in one of five transmission opportunities, and perform energy detection on the allocated transmission resource in the specified transmission timeslot.

After the first UE or the second UE determines the silent manner, when detecting that a detected energy value of the allocated transmission resource in the specified transmission timeslot is greater than a second energy threshold, the first UE or the second UE determines that the resource collision exists on the transmission resource and generates a resource collision message. After generating the resource collision message, the first UE or the second UE sends the resource collision message to the base station, so that the base station determines, according to the resource collision message, that the resource collision exists between the first UE and the second UE. The second energy threshold may be set by the base station. In this case, before step 1004, the method may further include: the base station sends energy threshold information to UE within coverage of the base station, where the energy threshold information is used to notify the UE of a second energy threshold in listening. When the UE receives the energy threshold information, the UE sets the UE itself according to the second energy threshold. Certainly, in an actual scenario, the second energy threshold not only may be set by the base station, but also may be a second energy threshold predefined on the user equipment. A source of the second energy threshold is not specifically limited in this embodiment of the present disclosure.

To improve precision of silence detection, the first UE and the second UE may use different silent manners, so that the first UE and the second UE keep silent in different transmission timeslots. This prevents the second UE (or the first UE) from being silent in the transmission timeslot when the first UE (or the second UE) keeps silent in the specified transmission timeslot. Otherwise, the first UE detects that the detected energy value of the occupied transmission resourced is less than the second energy threshold, and therefore, wrong determining is caused.

The base station may send different silence setting information to different UEs according to IDs (Identity, identity) of the UEs or identities of cells accessed by the UEs. The silence setting information may be random. For example, the silence setting information sent to the first UE is used to instruct the first UE to keep silent in a fifth transmission timeslot in every ten transmission timeslots, and the silence setting information sent to the second UE is used to instruct the second UE to keep silent in an eighth transmission timeslot in every ten transmission timeslots. Certainly, the silence setting information may also comply with a principle. For example, numbers of silent transmission timeslots increase in sequence. For example, the silence setting information sent to the first UE is used to instruct the first UE to keep silent in a first transmission timeslot in every ten transmission timeslots, and the silence setting information sent to the second UE is used to instruct the second UE to keep silent in a second transmission timeslot in every ten transmission timeslots. Different silence setting information is sent to different UEs, so that the first UE and the second UE use different silent manners. Certainly, the first UE may also set, on the first UE itself, a silence mechanism different from that on the second UE. Manners of determining different silence mechanisms by the first UE and the second UE are not limited in this embodiment of the present disclosure.

Certainly, the resource collision message in the foregoing process is sent by the first UE. In an actual scenario, the second UE performs detection on the transmission resource at a silent time, and may also detect that the transmission resource is already occupied by another UE. In this case, the second UE may also send a resource collision message to the base station. That is, when the base station receives the resource collision message sent by the second UE, the base station determines that the resource collision exists between the first UE and the second UE, where the resource collision message is obtained by the second UE by performing detection on the transmission resource at the silent time.

Second possible implementation: when receiving a resource collision message sent by third UE, determining that the resource collision exists between the first UE and the second UE, where the third UE is UE different from the first UE and the second UE within the coverage of the base station, and the resource collision message is obtained by the third UE by performing detection on the transmission resource.

To learn of the resource collision in time, the base station may send a broadcast message to the UE within the coverage of the base station, where the broadcast message carries a transmission resource index of the transmission resource, so that the UE within the coverage of the base station performs detection on the transmission resource.

Specifically, after the base station allocates the same transmission resource to the first UE and the second UE, the base station sends a broadcast message, where the broadcast message carries a transmission resource index allocated to the first UE and the second UE, so that the UE within the coverage of the base station performs detection on the transmission resource. When receiving the broadcast message sent by the base station, the third UE performs detection on the transmission resource according to the transmission resource index carried in the broadcast message. If the third UE successfully detects a signal on the transmission resource, but as the third UE moves, a change range of signal energy on the transmission resource is less than a preset threshold, and no signal can be successfully detected on the transmission resource again, and still no signal can be successfully detected within a preset duration, the third UE determines that the resource collision exists between the first UE and the second UE, and the third UE reports a resource collision indication to the base station.

1005. When determining that the resource collision exists between the first UE and the second UE, the base station reallocates a transmission resource to the first UE or the second UE.

Specifically, how to reallocate a transmission resource to the first UE or the second UE may be determined based on an allocation manner of the base station. For example, for which UE reallocation is performed may be determined according to service priorities of the first UE and the second UE. If a service priority of the first UE is higher, a transmission resource may be reallocated to the second UE. Certainly, reallocation may also be performed for one of the UEs randomly, or reallocation may be performed for both UEs, as long as allocated transmission resources are different. This is not limited in this embodiment of the present disclosure. Certainly, when reallocation is performed for either of the UEs, reallocation may be performed according to a resource allocation manner provided by this embodiment of the present disclosure.

1006. The base station sends the allocated transmission resource to the first UE or the second UE.

In the method provided by this embodiment of the present disclosure, the base station sends the resource multiplex message to the first UE and the second UE, so that the first UE and the second UE send the location information of the UEs to the base station periodically; when receiving the location information sent by the first UE and the second UE, the base station determines whether the distance between the first UE and the second UE is less than the second preset distance; when the base station determines that the distance between the first UE and the second UE is less than the second preset distance, the base station determines that a resource collision exists between the first UE and the second UE, and reallocates a transmission resource to the first UE and the second UE. Therefore, proper transmission resource allocation is implemented, and a transmission resource multiplex rate and a success rate of communication between vehicles in the Internet of Vehicles are increased.

Figure 11:
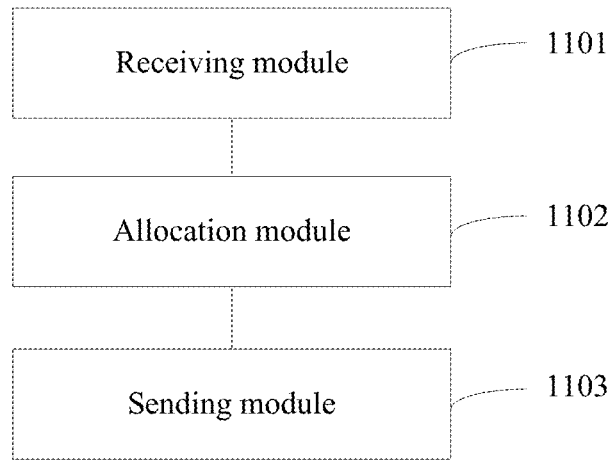
FIG. 11 is a schematic structural diagram of a base station according to an aspect of the present disclosure.

FIG. 11 is a schematic structural diagram of a base station according to an aspect of the present disclosure. Referring to FIG. 11, the base station includes:

a receiving module 1101, configured to receive a resource allocation request sent by first user equipment UE, where the first UE is any UE within coverage of the base station;

an allocation module 1102, configured to allocate, if the resource allocation request received by the receiving module 1101 carries a transmission resource index obtained by the first UE through listening, a transmission resource to the first UE according to the transmission resource index; and a sending module 1103, configured to send, to the first UE, the transmission resource allocated by the allocation module 1102.

In an embodiment of the present disclosure, the sending module 1103 is further configured to send listening setting information to the UE within the coverage of the base station before the receiving module 1101 receives the resource allocation request sent by the first UE, where the listening setting information is used to notify the UE of a duration of listening.

In an embodiment of the present disclosure, the sending module 1103 is specifically configured to:

send radio resource control protocol RRC signaling to the UE within the coverage of the base station, where the RRC signaling carries the listening setting information; or send a system information block SIB message to the UE within the coverage of the base station, where the SIB message carries the listening setting information; or send control signaling to the UE within the coverage of the base station, where the control signaling carries the listening setting information.

In an embodiment of the present disclosure, the sending module 1103 is further configured to send energy threshold information to the UE within the coverage of the base station before the receiving module 1101 receives the resource allocation request sent by the first UE, where the energy threshold information is used to notify the UE of a first energy threshold in listening.

In an embodiment of the present disclosure, the sending module 1103 is specifically configured to:

send RRC signaling to the UE within the coverage of the base station, where the RRC signaling carries the energy threshold information; or send a SIB message to the UE within the coverage of the base station, where the SIB message carries the energy threshold information; or send control signaling to the UE within the coverage of the base station, where the control signaling carries the energy threshold information.

In an embodiment of the present disclosure, the sending module 1103 is further configured to send quantity setting information to the UE within the coverage of the base station before the receiving module 1101 receives the resource allocation request sent by the first UE, where the quantity setting information is used to notify the UE of a quantity of transmission resource indexes to be carried when the resource allocation request is sent.

In an embodiment of the present disclosure, the base station further includes:

a judging module, configured to determine, if the resource allocation request does not carry any transmission resource index, whether the base station has any unallocated transmission resource; where when the judging module determines that the base station has an unallocated transmission resource, the allocation module 1102 is further configured to allocate the unallocated transmission resource to the first UE; or an obtaining module, configured to obtain location information of the first UE when a judging module determines that all transmission resources of the base station are already allocated; and a determining module, configured to determine, according to the location information of the first UE that is obtained by the obtaining module and location information of UEs to which the allocation module 1102 currently has already allocated transmission resources, second UE that meets a preset condition, where the preset condition is that a distance between the second UE and the first UE is greater than a first preset distance; where the allocation module 1102 is further configured to allocate, to the first UE, a transmission resource already allocated to the second UE determined by the determining module.

In an embodiment of the present disclosure, the receiving module 1101 is further configured to receive the location information of the first UE; and the obtaining module is configured to obtain the location information received by the receiving module 1101, as the location information of the first UE; or the obtaining module is configured to determine the location information of the first UE according to a transmit signal of the first UE; or the obtaining module is configured to use location information of the first UE that is previously obtained by the obtaining module, as current location information of the first UE.

In an embodiment of the present disclosure, the receiving module 1101 is specifically configured to:

receive global positioning system GPS location information of the first UE; or receive estimated location information of the first UE, where the estimated location information is location information obtained by the first UE through estimation according to a positioning reference signal transmitted by the base station; or receive area index information of an area in which the first UE is currently located.

In an embodiment of the present disclosure, the obtaining module is specifically configured to: determine a relative azimuth between the first UE and the base station according to the transmit signal of the first UE; and determine a distance between the first UE and the base station according to a detected energy value of the transmit signal of the first UE.

In an embodiment of the present disclosure, the transmit signal of the first UE is:

a physical uplink control channel PUCCH signal; or a physical uplink shared channel PUSCH signal; or a random access channel RACH; or a PUCCH signal used to carry a scheduling request SR; or a PUSCH signal used to carry a buffer status report BSR; or a communication signal between the first UE and another UE.

In an embodiment of the present disclosure, the base station further includes:

a collision determining module, configured to determine whether a resource collision exists between the first UE and the second UE; where the allocation module 1102 is further configured to reallocate a transmission resource to the first UE or the second UE when the collision determining module confirms that the resource collision exists between the first UE and the second UE.

In an embodiment of the present disclosure, the sending module 1103 is further configured to send a resource multiplex message to the first UE and the second UE separately after the allocation module 1102 allocates, to the first UE, the transmission resource already allocated to the second UE determined by the determining module, where the resource multiplex message is used to notify that the same transmission resource is allocated to the first UE and the second UE.

In an embodiment of the present disclosure, the collision determining module is specifically configured to: determine, in real time according to the location information of the first UE and location information of the second UE, whether the distance between the first UE and the second UE is less than a second preset distance; and when confirming that the distance between the first UE and the second UE is less than the second preset distance, determine that the resource collision exists between the first UE and the second UE.

In an embodiment of the present disclosure, the collision determining module is further configured to:

when the receiving module 1101 receives a resource collision message sent by the first UE, determine that the resource collision exists between the first UE and the second UE, where the resource collision message is obtained by the first UE by performing detection on the transmission resource at a silent time; or when the receiving module 1101 receives a resource collision message sent by the second UE, determine that the resource collision exists between the first UE and the second UE, where the resource collision message is obtained by the second UE by performing detection on the transmission resource at a silent time.

In an embodiment of the present disclosure, the sending module 1103 is further configured to send silence setting information to the first UE and the second UE separately after the allocation module 1102 allocates, to the first UE, the transmission resource already allocated to the second UE determined by the determining module, where the silence setting information is used to instruct the UEs to keep silent in a specified transmission timeslot.

In an embodiment of the present disclosure, when the receiving module 1101 receives a resource collision message sent by third UE, the collision determining module is further configured to determine that the resource collision exists between the first UE and the second UE, where the third UE is UE different from the first UE and the second UE within the coverage of the base station, and the resource collision message is obtained by the third UE by performing detection on the transmission resource.

In an embodiment of the present disclosure, the sending module 1103 is further configured to send a broadcast message to the UE within the coverage of the base station, where the broadcast message carries a transmission resource index allocated to the first UE and the second UE, and the transmission resource index is used by the UE within the coverage of the base station to perform detection on the transmission resource.

The foregoing base station may be configured to perform the resource allocation method performed by the base station in the embodiments corresponding to FIG. 2, subsequent FIG. 7, FIG. 8, and the like. A specific execution process is already described in detail in the foregoing method embodiments, and is not described again herein.

Figure 12:
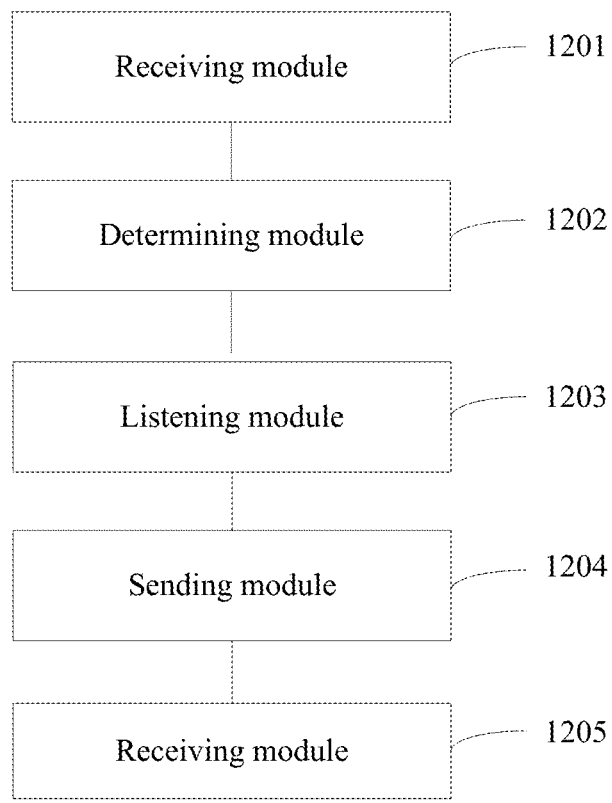
FIG. 12 is a schematic structural diagram of user equipment according to an aspect of the present disclosure.

FIG. 12 is a schematic structural diagram of user equipment according to an aspect of the present disclosure. Referring to FIG. 12, the user equipment includes:

a receiving module 1201, configured to receive listening setting information, where the listening setting information is used to notify the UE of a duration of listening;

a determining module 1202, configured to determine, according to the listening setting information received by the receiving module 1201, a duration of listening to be performed on transmission resources within coverage of a base station;

a listening module 1203, configured to listen to the transmission resources within the coverage of the base station; and a sending module 1204, configured to send a resource allocation request to the base station when a duration of the listening performed by the listening module 1203 reaches the preset duration determined by the determining module 1202, so that the base station allocates a transmission resource according to the resource allocation request; where the receiving module 1201 is further configured to receive the transmission resource allocated by the base station.

In an embodiment of the present disclosure, the listening module 1203 is specifically configured to: perform energy detection on the transmission resource to obtain a detected energy value; and when the detected energy value is less than a first energy threshold, obtain a transmission resource index of the transmission resource.

In an embodiment of the present disclosure, the resource allocation request carries the transmission resource index of the transmission resource.

In an embodiment of the present disclosure, the receiving module 1201 is further configured to receive energy threshold information from the base station before the listening module 1203 listens to the transmission resources within the coverage of the base station, where the energy threshold information is used to notify the UE of the first energy threshold in listening.

In an embodiment of the present disclosure, before the listening module 1203 listens to the transmission resources within the coverage of the base station, the receiving module 1201 is further configured to receive quantity setting information sent by the base station, where the quantity setting information is used to notify the UE of a quantity of transmission resource indexes to be carried when the resource allocation request is sent.

In an embodiment of the present disclosure, the sending module 1204 is further configured to send location information of the user equipment to the base station when it is determined that no transmission resource listened to by the listening module 1203 is idle.

In an embodiment of the present disclosure, the sending module 1204 is specifically configured to:

send GPS location information to the base station; or send estimated location information to the base station, where the estimated location information is location information obtained by the user equipment through estimation according to a positioning reference signal transmitted by the base station; or send area index information of an area in which the user equipment is currently located to the base station.

In an embodiment of the present disclosure, after receiving the transmission resource allocated by the base station, the receiving module 1201 is further configured to receive a resource multiplex message sent by the base station; and the sending module 1204 is further configured to periodically send location information of the user equipment to the base station, so that the base station determines, according to the location information of the user equipment, whether a resource collision exists.

In an embodiment of the present disclosure, after receiving the transmission resource allocated by the base station, the receiving module 1201 is further configured to receive silence setting information sent by the base station, where the silence setting information is used to instruct the UE to keep silent in a specified transmission timeslot; and the user equipment further includes:

a silence module, configured to keep silent in the specified transmission timeslot according to the silence setting information received by the receiving module 1201;

a resource collision determining module, configured to determine, when it is detected that a detected energy value of the transmission resource occupied by the user equipment in the specified transmission timeslot determined by the silence module is greater than a second energy threshold, that a resource collision exists; and a message generation module, configured to generate a resource collision message when the resource collision determining module 1202 determines that the resource collision exists; where the sending module 1204 is further configured to send the resource collision message generated by the message generation module to the base station.

The foregoing user equipment may be configured to perform the resource allocation method performed by the user equipment in the embodiments corresponding to FIG. 3, subsequent FIG. 7, FIG. 8, and the like. A specific execution process is already described in detail in the foregoing method embodiments, and is not described again herein.

Figure 13:
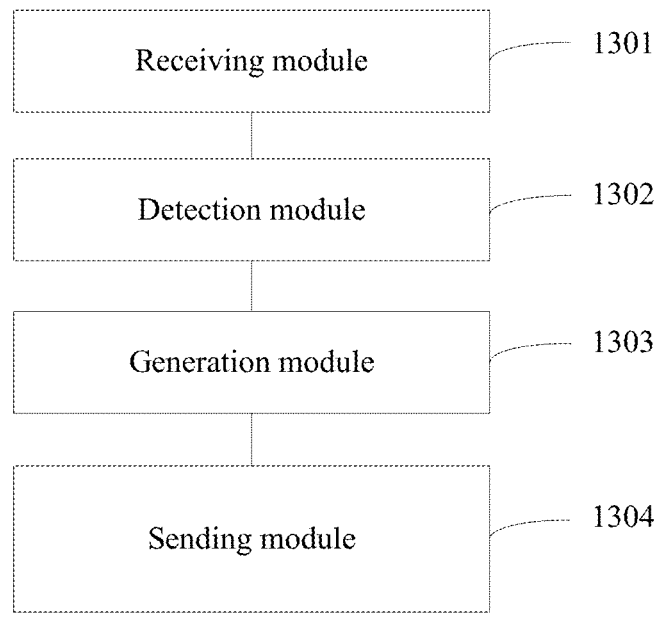
FIG. 13 is a schematic structural diagram of user equipment according to an aspect of the present disclosure.

FIG. 13 is a schematic structural diagram of user equipment according to an embodiment of the present disclosure. Referring to FIG. 13, the user equipment includes:

a receiving module 1301, configured to receive a broadcast message, where the broadcast message carries a transmission resource index allocated to first UE and second UE;

a detection module 1302, configured to perform detection on a transmission resource according to the transmission resource index received by the receiving module 1301;

a generation module 1303, configured to generate a resource collision message when the detection module 1302 determines that a resource collision exists on the transmission resource; and a sending module 1304, configured to send the resource collision message generated by the generation module 1303 to a base station, so that the base station determines, according to the resource collision message, that the resource collision exists between the first UE and the second UE.

In an embodiment of the present disclosure, the detection module 1302 is specifically configured to: perform detection on the transmission resource corresponding to the transmission resource index received by the receiving module 1301; and if a signal is successfully detected on the transmission resource, but as the user equipment moves, a change range of signal energy on the transmission resource is less than a preset threshold, and no signal can be successfully detected on the transmission resource again, and still no signal can be successfully detected within a preset duration, determine that the resource collision exists between the first UE and the second UE.

The foregoing user equipment may be configured to perform the resource allocation method performed by the user equipment in the embodiments corresponding to FIG. 4, subsequent FIG. 7, FIG. 8, and the like. A specific execution process is already described in detail in the foregoing method embodiments, and is not described again herein.

Figure 14:
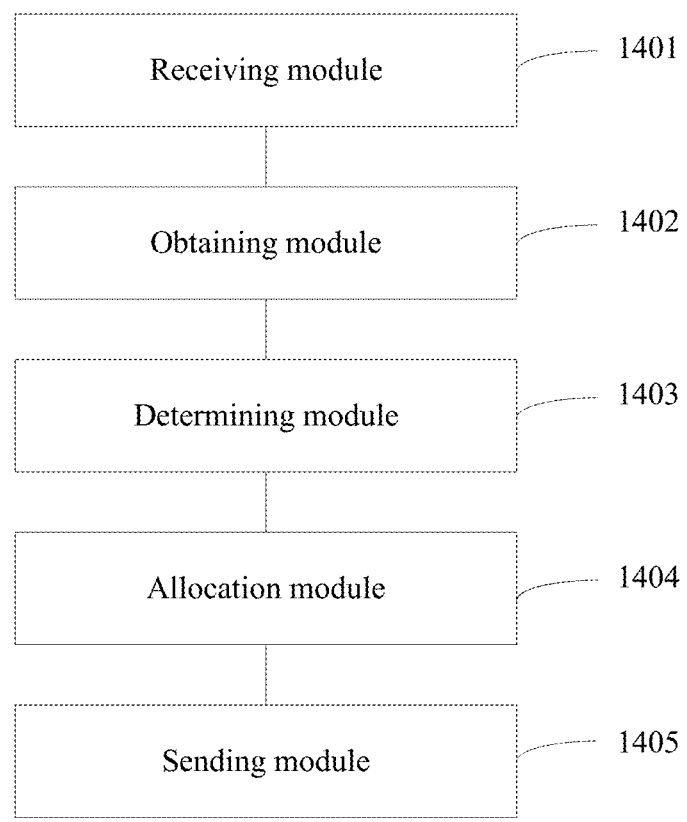
FIG. 14 is a schematic structural diagram of a base station according to an aspect of the present disclosure.

FIG. 14 is a schematic structural diagram of a base station according to an embodiment of the present disclosure. Referring to FIG. 14, the base station includes:

a receiving module 1401, configured to receive a resource allocation request from first UE, where the first UE is any UE within coverage of the base station;

an obtaining module 1402, configured to obtain location information of the first UE;

a determining module 1403, configured to determine, according to the location information of the first UE that is obtained by the obtaining module 1402 and location information of UEs to which transmission resources are currently already allocated, second UE that meets a preset condition, where the preset condition is that a distance between the second UE and the first UE is greater than a first preset distance;

an allocation module 1404, configured to allocate, to the first UE, a transmission resource already allocated to the second UE determined by the determining module 1403; and a sending module 1405, configured to send, to the first UE, the transmission resource allocated by the allocation module 1404.

In an embodiment of the present disclosure, the obtaining module 1402 is specifically configured to: obtain location information received by the receiving module 1401, as the location information of the first UE; or the obtaining module 1402 is configured to determine the location information of the first UE according to a transmit signal of the first UE; or the obtaining module 1402 is configured to use location information of the first UE that is previously obtained, as current location information of the first UE.

In an embodiment of the present disclosure, the receiving module 1401 is specifically configured to:

receive GPS location information of the first UE; or receive estimated location information of the first UE, where the estimated location information is location information obtained by the first UE through estimation according to a positioning reference signal transmitted by the base station; or receive area index information of an area in which the first UE is currently located.

In an embodiment of the present disclosure, the obtaining module 1402 is specifically configured to: determine a relative azimuth between the first UE and the base station according to the transmit signal of the first UE; and determine a distance between the first UE and the base station according to a detected energy value of the transmit signal of the first UE.

In an embodiment of the present disclosure, the transmit signal of the first UE is:

a physical uplink control channel PUCCH signal; or a physical uplink shared channel PUSCH signal; or a random access channel RACH; or a PUCCH signal used to carry a scheduling request SR; or a PUSCH signal used to carry a buffer status report BSR; or a communication signal between the first UE and another UE.

In an embodiment of the present disclosure, the base station further includes:

a collision determining module, configured to determine whether a resource collision exists between the first UE and the second UE; where the allocation module 1404 is further configured to reallocate a transmission resource to the first UE or the second UE when the resource determining module determines that the resource collision exists between the first UE and the second UE.

In an embodiment of the present disclosure, the sending module 1405 is further configured to send a resource multiplex message to the first UE and the second UE separately after sending, to the first UE, the transmission resource allocated by the allocation module 1404, where the resource multiplex message is used to notify that the same transmission resource is allocated to the first UE and the second UE.

In an embodiment of the present disclosure, the collision determining module is specifically configured to: determine, in real time according to the location information of the first UE and location information of the second UE, whether the distance between the first UE and the second UE is less than a second preset distance; and when confirming that the distance between the first UE and the second UE is less than the second preset distance, determine that the resource collision exists between the first UE and the second UE.

In an embodiment of the present disclosure, the collision determining module is specifically configured to: when the receiving module 1401 receives a resource collision message sent by the first UE, determine that the resource collision exists between the first UE and the second UE, where the resource collision message is obtained by the first UE by performing detection on the transmission resource at a silent time; or when the receiving module 1401 receives a resource collision message sent by the second UE, determine that the resource collision exists between the first UE and the second UE, where the resource collision message is obtained by the second UE by performing detection on the transmission resource at a silent time.

In an embodiment of the present disclosure, the sending module 1405 is further configured to send silence setting information to the first UE and the second UE separately after sending, to the first UE, the transmission resource allocated by the allocation module 1404, where the silence setting information is used to instruct the UEs to keep silent in a specified transmission timeslot.

In an embodiment of the present disclosure, when the receiving module 1401 receives a resource collision message sent by third UE, the collision determining module is specifically configured to determine that the resource collision exists between the first UE and the second UE, where the third UE is UE different from the first UE and the second UE within the coverage of the base station, and the resource collision message is obtained by the third UE by performing detection on the transmission resource.

In an embodiment of the present disclosure, the sending module 1405 is further configured to send a broadcast message to the UE within the coverage of the base station after sending, to the first UE, the transmission resource allocated by the allocation module 1404, where the broadcast message carries a transmission resource index allocated to the first UE and the second UE, and the transmission resource index is used by the UE within the coverage of the base station to perform detection on the transmission resource.

The foregoing base station may be configured to perform the resource allocation method performed by the base station in the embodiments corresponding to FIG. 5, subsequent FIG. 9, FIG. 10, and the like. A specific execution process is already described in detail in the foregoing method embodiments, and is not described again herein.

Figure 15:
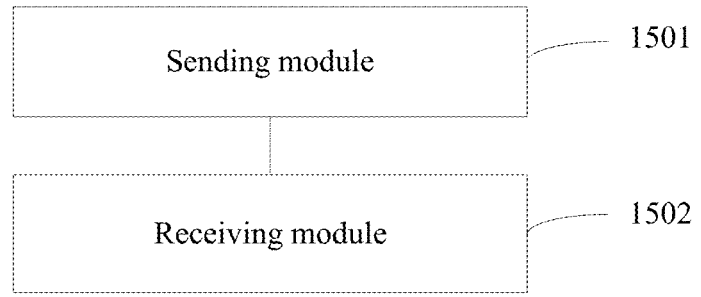
FIG. 15 is a schematic structural diagram of user equipment according to an aspect of the present disclosure.

FIG. 15 is a schematic structural diagram of user equipment according to an aspect of the present disclosure. Referring to FIG. 15, the user equipment includes:

a sending module 1501, configured to send a resource allocation request to a base station; where the sending module 1501 is configured to send location information of the user equipment to the base station, so that the base station allocates a transmission resource according to the location information of the user equipment and location information of UEs to which transmission resources are currently already allocated; and a receiving module 1502, configured to receive the transmission resource allocated by the base station.

In an embodiment of the present disclosure, the sending module 1501 is specifically configured to:

send GPS location information to the base station; or send estimated location information to the base station, where the estimated location information is location information obtained by the user equipment through estimation according to a positioning reference signal transmitted by the base station; or send area index information of an area in which the user equipment is currently located to the base station.

In an embodiment of the present disclosure, after receiving the transmission resource allocated by the base station, the receiving module 1502 is further configured to receive a resource multiplex message sent by the base station; and the sending module 1501 is further configured to periodically send the location information of the user equipment to the base station, so that the base station determines, according to the location information of the user equipment, whether a resource collision exists.

In an embodiment of the present disclosure, after receiving the transmission resource allocated by the base station, the receiving module 1502 is further configured to receive silence setting information sent by the base station, where the silence setting information is used to instruct the UE to keep silent in a specified transmission timeslot; and the user equipment further includes:

a silence module, configured to keep silent in the specified transmission timeslot according to the silence setting information received by the receiving module 1502;

a detection module, configured to perform detection on the transmission resource occupied by the user equipment in the specified transmission timeslot when the silence module keeps silent;

a collision determining module, configured to determine, when the detection module detects that a detected energy value of the transmission resource occupied by the user equipment is greater than a second energy threshold, that a resource collision exists; and a generation module, configured to generate a resource collision message when the collision determining module determines that the resource collision exists; where the sending module 1501 is further configured to send the resource collision message generated by the generation module to the base station.

The foregoing user equipment may be configured to perform the resource allocation method performed by the user equipment in the embodiments corresponding to FIG. 6, subsequent FIG. 9, FIG. 10, and the like. A specific execution process is already described in detail in the foregoing method embodiments, and is not described again herein.

Figure 16:
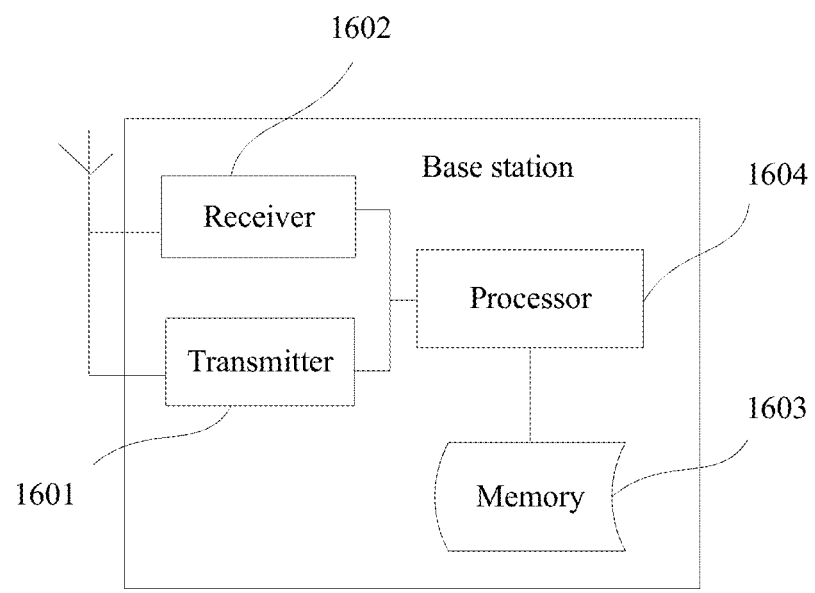
FIG. 16 is a schematic structural diagram of a base station according to an aspect of the present disclosure.

FIG. 16 is a schematic structural diagram of a base station according to an aspect of the present disclosure. As shown in FIG. 16, the base station includes a transmitter 1601, a receiver 1602, a memory 1603, and a processor 1604 that is connected to the transmitter 1601, the receiver 1602, and the memory 1603 separately. Certainly, the base station may further include a universal component such as an antenna, a baseband processing unit, an intermediate radio frequency processing component, or an input/output apparatus. This is no longer limited in this embodiment of the present disclosure.

The memory stores a group of program code, and the processor 1604 is configured to invoke the program code stored in the memory, so that the processor 1604 is configured to perform each operation in the foregoing resource allocation method.

Figure 17:
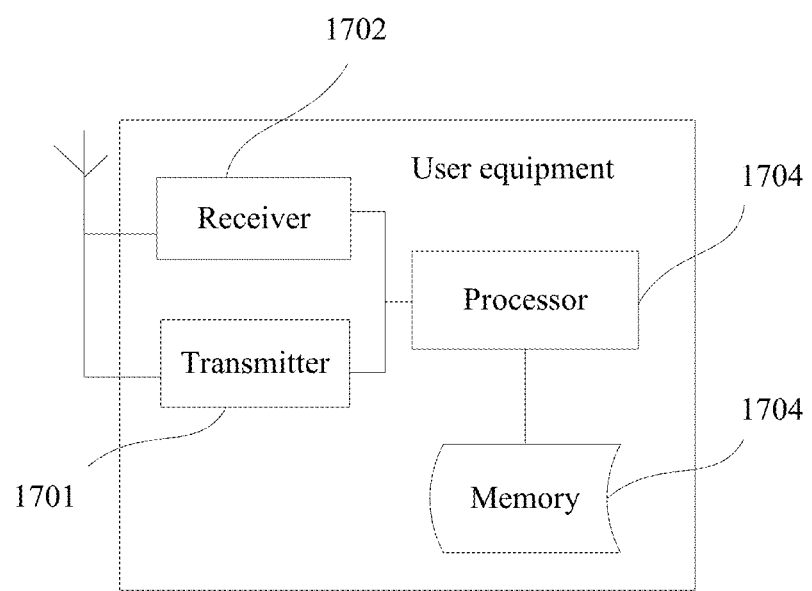
FIG. 17 is a schematic structural diagram of user equipment according to an aspect of the present disclosure.

FIG. 17 is a schematic structural diagram of user equipment according to an aspect of the present disclosure. As shown in FIG. 17, the user equipment includes a transmitter 1701, a receiver 1702, a memory 1703, and a processor 1704 that is connected to the transmitter 1701, the receiver 1702, and the memory 1703 separately. Certainly, the user equipment may further include a universal component such as an antenna, a baseband processing component, an intermediate radio frequency processing component, or an input/output apparatus. This is no longer limited in this embodiment of the present disclosure.

The memory stores a group of program code, and the processor is configured to invoke the program code stored in the memory, so that the processor is configured to perform each operation in the foregoing resource allocation method.

With reference to the first aspect, in a first possible implementation of the first aspect, the sending module is further configured to send listening setting information to the UE within the coverage of the base station before the receiving module receives the resource allocation request sent by the first UE, where the listening setting information is used to notify the UE of a duration of listening.

With reference to the first possible implementation, in a second possible implementation of the first aspect, the sending module is specifically configured to:

send radio resource control protocol RRC signaling to the UE within the coverage of the base station, where the RRC signaling carries the listening setting information; or send a system information block SIB message to the UE within the coverage of the base station, where the SIB message carries the listening setting information; or send control signaling to the UE within the coverage of the base station, where the control signaling carries the listening setting information.

With reference to the foregoing possible implementation, in a third possible implementation of the first aspect, the sending module is further configured to send energy threshold information to the UE within the coverage of the base station before the receiving module receives the resource allocation request sent by the first UE, where the energy threshold information is used to notify the UE of a first energy threshold in listening.

With reference to the third possible implementation, in a fourth possible implementation of the first aspect, the sending module is specifically configured to:

send RRC signaling to the UE within the coverage of the base station, where the RRC signaling carries the energy threshold information; or send a SIB message to the UE within the coverage of the base station, where the SIB message carries the energy threshold information; or send control signaling to the UE within the coverage of the base station, where the control signaling carries the energy threshold information.

With reference to the foregoing possible implementation, in a fifth possible implementation of the first aspect, the sending module is further configured to send quantity setting information to the UE within the coverage of the base station before the receiving module receives the resource allocation request sent by the first UE, where the quantity setting information is used to notify the UE of a quantity of transmission resource indexes to be carried when the resource allocation request is sent.

With reference to the foregoing possible implementation, in a sixth possible implementation of the first aspect, the base station further includes:

a judging module, configured to determine, if the resource allocation request does not carry any transmission resource index, whether the base station has any unallocated transmission resource; where when the judging module determines that the base station has an unallocated transmission resource, the allocation module is further configured to allocate the unallocated transmission resource to the first UE; or an obtaining module, configured to obtain location information of the first UE when a judging module determines that all transmission resources of the base station are already allocated; and a determining module, configured to determine, according to the location information of the first UE that is obtained by the obtaining module and location information of UEs to which the allocation module currently has already allocated transmission resources, second UE that meets a preset condition, where the preset condition is that a distance between the second UE and the first UE is greater than a first preset distance; where the allocation module is further configured to allocate, to the first UE, a transmission resource already allocated to the second UE determined by the determining module.

With reference to the foregoing possible implementation, in a seventh possible implementation of the first aspect, the receiving module is further configured to receive the location information of the first UE; and the obtaining module is configured to obtain the location information received by the receiving module, as the location information of the first UE; or the obtaining module is configured to determine the location information of the first UE according to a transmit signal of the first UE; or the obtaining module is configured to use location information of the first UE that is previously obtained by the obtaining module, as current location information of the first UE.

With reference to the foregoing possible implementation, in an eighth possible implementation of the first aspect, the receiving module is specifically configured to:

receive global positioning system GPS location information of the first UE; or receive estimated location information of the first UE, where the estimated location information is location information obtained by the first UE through estimation according to a positioning reference signal transmitted by the base station; or receive area index information of an area in which the first UE is currently located.

With reference to the foregoing possible implementation, in a ninth possible implementation of the first aspect, the obtaining module is specifically configured to: determine a relative azimuth between the first UE and the base station according to the transmit signal of the first UE; and determine a distance between the first UE and the base station according to a detected energy value of the transmit signal of the first UE.

With reference to the foregoing possible implementation, in a tenth possible implementation of the first aspect, the transmit signal of the first UE is:
  a physical uplink control channel PUCCH signal; or
  a physical uplink shared channel PUSCH signal; or
  a random access channel RACH; or
  a PUCCH signal used to carry a scheduling request SR; or
  a PUSCH signal used to carry a buffer status report BSR; or
  a communication signal between the first UE and another UE.

With reference to the foregoing possible implementation, in an eleventh possible implementation of the first aspect, the base station further includes:
  a collision determining module, configured to determine whether a resource collision exists between the first UE and the second UE; where
  the allocation module is further configured to reallocate a transmission resource to the first UE or the second UE when the collision determining module confirms that the resource collision exists between the first UE and the second UE.

With reference to the foregoing possible implementation, in a twelfth possible implementation of the first aspect, the sending module is further configured to send a resource multiplex message to the first UE and the second UE separately after the allocation module allocates, to the first UE, the transmission resource already allocated to the second UE determined by the determining module, where the resource multiplex message is used to notify that the same transmission resource is allocated to the first UE and the second UE.

With reference to the foregoing possible implementation, in a thirteenth possible implementation of the first aspect, the collision determining module is specifically configured to: determine, in real time according to the location information of the first UE and location information of the second UE, whether the distance between the first UE and the second UE is less than a second preset distance; and when confirming that the distance between the first UE and the second UE is less than the second preset distance, determine that the resource collision exists between the first UE and the second UE.

With reference to the foregoing possible implementation, in a fourteenth possible implementation of the first aspect, the collision determining module is further configured to:
  when the receiving module receives a resource collision message sent by the first UE, determine that the resource collision exists between the first UE and the second UE, where the resource collision message is obtained by the first UE by performing detection on the transmission resource at a silent time; or when the receiving module receives a resource collision message sent by the second UE, determine that the resource collision exists between the first UE and the second UE, where the resource collision message is obtained by the second UE by performing detection on the transmission resource at a silent time.

With reference to the foregoing possible implementation, in a fifteenth possible implementation of the first aspect, the sending module is further configured to send silence setting information to the first UE and the second UE separately after the allocation module allocates, to the first UE, the transmission resource already allocated to the second UE determined by the determining module, where the silence setting information is used to instruct the UEs to keep silent in a specified transmission timeslot.

With reference to the foregoing possible implementation, in a sixteenth possible implementation of the first aspect, when the receiving module receives a resource collision message sent by third UE, the collision determining module is further configured to determine that the resource collision exists between the first UE and the second UE, where the third UE is UE different from the first UE and the second UE within the coverage of the base station, and the resource collision message is obtained by the third UE by performing detection on the transmission resource.

With reference to the foregoing possible implementation, in a seventeenth possible implementation of the first aspect, the sending module is further configured to send a broadcast message to the UE within the coverage of the base station, where the broadcast message carries a transmission resource index allocated to the first UE and the second UE, and the transmission resource index is used by the UE within the coverage of the base station to perform detection on the transmission resource.

With reference to the second aspect, in a first possible implementation of the second aspect, the listening module is specifically configured to: perform energy detection on the transmission resource to obtain a detected energy value; and when the detected energy value is less than a first energy threshold, obtain a transmission resource index of the transmission resource.

With reference to the foregoing possible implementation, in a second possible implementation of the second aspect, the resource allocation request carries the transmission resource index of the transmission resource.

With reference to the foregoing possible implementation, in a third possible implementation of the second aspect, the receiving module is further configured to receive energy threshold information from the base station before the listening module listens to the transmission resources within the coverage of the base station, where the energy threshold information is used to notify the UE of the first energy threshold in listening.

With reference to the foregoing possible implementation, in a fourth possible implementation of the second aspect, before the listening module listens to the transmission resources within the coverage of the base station, the receiving module is further configured to receive quantity setting information sent by the base station, where the quantity setting information is used to notify the UE of a quantity of transmission resource indexes to be carried when the resource allocation request is sent.

With reference to the foregoing possible implementation, in a fifth possible implementation of the second aspect, the sending module is further configured to send location information of the user equipment to the base station when it is determined that no transmission resource listened to by the listening module is idle.

With reference to the foregoing possible implementation, in a sixth possible implementation of the second aspect, the sending module is specifically configured to:
  send GPS location information to the base station; or send estimated location information to the base station, where the estimated location information is location information obtained by the user equipment through estimation according to a positioning reference signal transmitted by the base station; or send area index information of an area in which the user equipment is currently located to the base station.

With reference to the foregoing possible implementation, in a seventh possible implementation of the second aspect, after receiving the transmission resource allocated by the base station, the receiving module is further configured to receive a resource multiplex message sent by the base station; and the sending module is further configured to periodically send location information of the user equipment to the base station, so that the base station determines, according to the location information of the user equipment, whether a resource collision exists.

With reference to the foregoing possible implementation, in an eighth possible implementation of the second aspect, after receiving the transmission resource allocated by the base station, the receiving module is further configured to receive silence setting information sent by the base station, where the silence setting information is used to instruct the UE to keep silent in a specified transmission timeslot; and the user equipment further includes:

a silence module, configured to keep silent in the specified transmission timeslot according to the silence setting information received by the receiving module;

a resource collision determining module, configured to determine, when it is detected that a detected energy value of the transmission resource occupied by the user equipment in the specified transmission timeslot determined by the silence module is greater than a second energy threshold, that a resource collision exists; and a message generation module, configured to generate a resource collision message when the resource collision determining module determines that the resource collision exists; where the sending module is further configured to send the resource collision message generated by the message generation module to the base station.

With reference to the third aspect, in a first possible implementation of the third aspect, the detection module is specifically configured to: perform detection on the transmission resource corresponding to the transmission resource index received by the receiving module; and if a signal is successfully detected on the transmission resource, but as the user equipment moves, a change range of signal energy on the transmission resource is less than a preset threshold, and no signal can be successfully detected on the transmission resource again, and still no signal can be successfully detected within a preset duration, determine that the resource collision exists between the first UE and the second UE.

With reference to the fourth aspect, in a first possible implementation of the fourth aspect, the obtaining module is specifically configured to obtain location information received by the receiving module, as the location information of the first UE; or the obtaining module is configured to determine the location information of the first UE according to a transmit signal of the first UE; or the obtaining module is configured to use location information of the first UE that is previously obtained, as current location information of the first UE.

With reference to the foregoing possible implementation, in a second possible implementation of the fourth aspect, the receiving module is specifically configured to:

receive GPS location information of the first UE; or receive estimated location information of the first UE, where the estimated location information is location information obtained by the first UE through estimation according to a positioning reference signal transmitted by the base station; or receive area index information of an area in which the first UE is currently located.

With reference to the foregoing possible implementation, in a third possible implementation of the fourth aspect, the obtaining module is specifically configured to: determine a relative azimuth between the first UE and the base station according to the transmit signal of the first UE; and determine a distance between the first UE and the base station according to a detected energy value of the transmit signal of the first UE.

With reference to the foregoing possible implementation, in a fourth possible implementation of the fourth aspect, the transmit signal of the first UE is:

a physical uplink control channel PUCCH signal; or a physical uplink shared channel PUSCH signal; or a random access channel RACH; or a PUCCH signal used to carry a scheduling request SR; or a PUSCH signal used to carry a buffer status report BSR; or a communication signal between the first UE and another UE.

With reference to the foregoing possible implementation, in a fifth possible implementation of the fourth aspect, the base station further includes:

a collision determining module, configured to determine whether a resource collision exists between the first UE and the second UE; where the allocation module is further configured to reallocate a transmission resource to the first UE or the second UE when the resource determining module determines that the resource collision exists between the first UE and the second UE.

With reference to the foregoing possible implementation, in a sixth possible implementation of the fourth aspect, the sending module is further configured to send a resource multiplex message to the first UE and the second UE separately after sending, to the first UE, the transmission resource allocated by the allocation module, where the resource multiplex message is used to notify that the same transmission resource is allocated to the first UE and the second UE.

With reference to the foregoing possible implementation, in a seventh possible implementation of the fourth aspect, the collision determining module is specifically configured to: determine, in real time according to the location information of the first UE and location information of the second UE, whether the distance between the first UE and the second UE is less than a second preset distance; and when confirming that the distance between the first UE and the second UE is less than the second preset distance, determine that the resource collision exists between the first UE and the second UE.

With reference to the foregoing possible implementation, in an eighth possible implementation of the fourth aspect, the collision determining module is specifically configured to: when the receiving module receives a resource collision message sent by the first UE, determine that the resource collision exists between the first UE and the second UE, where the resource collision message is obtained by the first UE by performing detection on the transmission resource at a silent time; or when the receiving module receives a resource collision message sent by the second UE, determine that the resource collision exists between the first UE and the second UE, where the resource collision message is obtained by the second UE by performing detection on the transmission resource at a silent time.

With reference to the foregoing possible implementation, in a ninth possible implementation of the fourth aspect, the sending module is further configured to send silence setting information to the first UE and the second UE separately after sending, to the first UE, the transmission resource allocated by the allocation module, where the silence setting information is used to instruct the UEs to keep silent in a specified transmission timeslot.

With reference to the foregoing possible implementation, in a tenth possible implementation of the fourth aspect, when the receiving module receives a resource collision message sent by third UE, the collision determining module is specifically configured to determine that the resource collision exists between the first UE and the second UE, where the third UE is UE different from the first UE and the second UE within the coverage of the base station, and the resource collision message is obtained by the third UE by performing detection on the transmission resource.

With reference to the foregoing possible implementation, in an eleventh possible implementation of the fourth aspect, the sending module is further configured to send a broadcast message to the UE within the coverage of the base station after sending, to the first UE, the transmission resource allocated by the allocation module, where the broadcast message carries a transmission resource index allocated to the first UE and the second UE, and the transmission resource index is used by the UE within the coverage of the base station to perform detection on the transmission resource.

With reference to the fifth aspect, in a first possible implementation of the fifth aspect, the sending module is specifically configured to:

send GPS location information to the base station; or send estimated location information to the base station, where the estimated location information is location information obtained by the user equipment through estimation according to a positioning reference signal transmitted by the base station; or send area index information of an area in which the user equipment is currently located to the base station.

With reference to the foregoing possible implementation, in a second possible implementation of the fifth aspect, after receiving the transmission resource allocated by the base station, the receiving module is further configured to receive a resource multiplex message sent by the base station; and the sending module is further configured to periodically send the location information of the user equipment to the base station, so that the base station determines, according to the location information of the user equipment, whether a resource collision exists.

With reference to the foregoing possible implementation, in a third possible implementation of the fifth aspect, after receiving the transmission resource allocated by the base station, the receiving module is further configured to receive silence setting information sent by the base station, where the silence setting information is used to instruct the UE to keep silent in a specified transmission timeslot; and the user equipment further includes:

a silence module, configured to keep silent in the specified transmission timeslot according to the silence setting information received by the receiving module;

a detection module, configured to perform detection on the transmission resource occupied by the user equipment in the specified transmission timeslot when the silence module keeps silent;

a collision determining module, configured to determine, when the detection module detects that a detected energy value of the transmission resource occupied by the user equipment is greater than a second energy threshold, that a resource collision exists; and a generation module, configured to generate a resource collision message when the collision determining module determines that the resource collision exists; where the sending module is further configured to send the resource collision message generated by the generation module to the base station.

With reference to the sixth aspect, in a first possible implementation of the sixth aspect, before the receiving a resource allocation request sent by first UE, the method further includes:

sending listening setting information to the UE within the coverage of the base station, where the listening setting information is used to notify the UE of a duration of listening.

With reference to the first possible implementation, in a second possible implementation of the sixth aspect, the sending listening setting information to the UE within the coverage of the base station includes:

sending RRC signaling to the UE within the coverage of the base station, where the RRC signaling carries the listening setting information; or sending a SIB message to the UE within the coverage of the base station, where the SIB message carries the listening setting information; or sending control signaling to the UE within the coverage of the base station, where the control signaling carries the listening setting information.

With reference to the foregoing possible implementation, in a third possible implementation of the sixth aspect, before the receiving a resource allocation request sent by first UE, the method further includes:

sending energy threshold information to the UE within the coverage of the base station, where the energy threshold information is used to notify the UE of a first energy threshold in listening.

With reference to the third possible implementation, in a fourth possible implementation of the sixth aspect, the sending energy threshold information to the UE within the coverage of the base station includes:

sending RRC signaling to the UE within the coverage of the base station, where the RRC signaling carries the energy threshold information; or sending a SIB message to the UE within the coverage of the base station, where the SIB message carries the energy threshold information; or sending control signaling to the UE within the coverage of the base station, where the control signaling carries the energy threshold information.

With reference to the foregoing possible implementation, in a fifth possible implementation of the sixth aspect, before the receiving a resource allocation request sent by first UE, the method further includes:

sending quantity setting information to the UE within the coverage of the base station, where the quantity setting information is used to notify the UE of a quantity of transmission resource indexes to be carried when the resource allocation request is sent.

With reference to the foregoing possible implementation, in a sixth possible implementation of the sixth aspect, after the receiving a resource allocation request sent by first UE, the method further includes:

if the resource allocation request does not carry any transmission resource index, determining whether the base station has any unallocated transmission resource; and when determining that the base station has an unallocated transmission resource, allocating the unallocated transmission resource to the first UE; or when determining that all transmission resources of the base station are already allocated, obtaining location information of the first UE;

determining, according to the location information of the first UE and location information of UEs to which transmission resources are currently already allocated, second UE that meets a preset condition, where the preset condition is that a distance between the second UE and the first UE is greater than a first preset distance;

allocating, to the first UE, a transmission resource already allocated to the second UE.

With reference to the foregoing possible implementation, in a seventh possible implementation of the sixth aspect, the obtaining location information of the first UE includes:

receiving the location information of the first UE; or determining the location information of the first UE according to a transmit signal of the first UE; or using previously obtained location information of the first UE as current location information of the first UE.

With reference to the foregoing possible implementation, in an eighth possible implementation of the sixth aspect, the receiving the location information sent by the first UE includes:

receiving GPS location information of the first UE; or receiving estimated location information of the first UE, where the estimated location information is location information obtained by the first UE through estimation according to a positioning reference signal transmitted by the base station; or receiving area index information of an area in which the first UE is currently located.

With reference to the foregoing possible implementation, in a ninth possible implementation of the sixth aspect, the determining the location information of the first UE according to a transmit signal of the first UE includes:

determining a relative azimuth between the first UE and the base station according to the transmit signal of the first UE; and determining a distance between the first UE and the base station according to a detected energy value of the transmit signal of the first UE.

With reference to the foregoing possible implementation, in a tenth possible implementation of the sixth aspect, the transmit signal of the first UE is:

a physical uplink control channel PUCCH signal; or a physical uplink shared channel PUSCH signal; or a random access channel RACH; or a PUCCH signal used to carry a scheduling request SR; or a PUSCH signal used to carry a buffer status report BSR; or a communication signal between the first UE and another UE.

With reference to the foregoing possible implementation, in an eleventh possible implementation of the sixth aspect, after the sending the allocated transmission resource to the first UE, the method further includes:

determining whether a resource collision exists between the first UE and the second UE; and when confirming that the resource collision exists between the first UE and the second UE, reallocating a transmission resource to the first UE or the second UE.

With reference to the foregoing possible implementation, in a twelfth possible implementation of the sixth aspect, after the sending the allocated transmission resource to the first UE, the method further includes:

sending a resource multiplex message to the first UE and the second UE separately, where the resource multiplex message is used to notify that the same transmission resource is allocated to the first UE and the second UE.

With reference to the foregoing possible implementation, in a thirteenth possible implementation of the sixth aspect, the determining whether a resource collision exists between the first UE and the second UE includes:

determining, in real time according to the location information of the first UE and location information of the second UE, whether the distance between the first UE and the second UE is less than a second preset distance; and when confirming that the distance between the first UE and the second UE is less than the second preset distance, determining that the resource collision exists between the first UE and the second UE.

With reference to the foregoing possible implementation, in a fourteenth possible implementation of the sixth aspect, the determining whether a resource collision exists between the first UE and the second UE includes:

when receiving a resource collision message sent by the first UE, determining that the resource collision exists between the first UE and the second UE, where the resource collision message is obtained by the first UE by performing detection on the transmission resource at a silent time; or when receiving a resource collision message sent by the second UE, determining that the resource collision exists between the first UE and the second UE, where the resource collision message is obtained by the second UE by performing detection on the transmission resource at a silent time.

With reference to the foregoing possible implementation, in a fifteenth possible implementation of the sixth aspect, before the determining whether a resource collision exists between the first UE and the second UE, the method further includes:

sending silence setting information to the first UE and the second UE separately, where the silence setting information is used to instruct the UEs to keep silent in a specified transmission timeslot.

With reference to the foregoing possible implementation, in a sixteenth possible implementation of the sixth aspect, the determining whether a resource collision exists between the first UE and the second UE includes:

when receiving a resource collision message sent by third UE, determining that the resource collision exists between the first UE and the second UE, where the third UE is UE different from the first UE and the second UE within the coverage of the base station, and the resource collision message is obtained by the third UE by performing detection on the transmission resource.

With reference to the foregoing possible implementation, in a seventeenth possible implementation of the sixth aspect, before the determining whether a resource collision exists between the first UE and the second UE, the method further includes:

sending a broadcast message to the UE within the coverage of the base station, where the broadcast message carries a transmission resource index allocated to the first UE and the second UE, and the transmission resource index is used by the UE within the coverage of the base station to perform detection on the transmission resource.

With reference to the seventh aspect, in a first possible implementation of the seventh aspect, the listening to the transmission resources within the coverage of the base station includes:

performing energy detection on the transmission resource to obtain a detected energy value; and when the detected energy value is less than a first energy threshold, obtaining a transmission resource index of the transmission resource.

With reference to the foregoing possible implementation, in a second possible implementation of the seventh aspect, the resource allocation request carries the transmission resource index of the transmission resource.

With reference to the foregoing possible implementation, in a third possible implementation of the seventh aspect, before the listening to the transmission resources within the coverage of the base station, the method further includes:

receiving energy threshold information from the base station, where the energy threshold information is used to notify the UE of the first energy threshold in listening.

With reference to the foregoing possible implementation, in a fourth possible implementation of the seventh aspect, before the sending a resource allocation request to the base station when a duration of the listening reaches the preset duration, the method further includes:

receiving quantity setting information sent by the base station, where the quantity setting information is used to notify the UE of a quantity of transmission resource indexes to be carried when the resource allocation request is sent; and determining, according to the quantity setting request, the quantity of transmission resource indexes to be carried in the resource allocation request.

With reference to the foregoing possible implementation, in a fifth possible implementation of the seventh aspect, the method further includes:

when determining that no transmission resource that is listened to is idle, sending location information of the user equipment to the base station.

With reference to the foregoing possible implementation, in a sixth possible implementation of the seventh aspect, the sending location information of the user equipment to the base station includes:

sending GPS location information to the base station; or sending estimated location information to the base station, where the estimated location information is location information obtained by the user equipment through estimation according to a positioning reference signal transmitted by the base station; or sending area index information of an area in which the user equipment is currently located to the base station.

With reference to the foregoing possible implementation, in a seventh possible implementation of the seventh aspect, after the receiving the transmission resource allocated by the base station, the method further includes:

receiving a resource multiplex message sent by the base station; and periodically sending location information of the user equipment to the base station, so that the base station determines, according to the location information of the user equipment, whether a resource collision exists.

With reference to the foregoing possible implementation, in an eighth possible implementation of the seventh aspect, after the receiving the transmission resource allocated by the base station, the method further includes:

receiving silence setting information sent by the base station, where the silence setting information is used to instruct the UE to keep silent in a specified transmission timeslot;

keeping silent in the specified transmission timeslot according to the silence setting information;

when detecting that a detected energy value of the transmission resource occupied by the user equipment in the specified transmission timeslot is greater than a second energy threshold, determining that a resource collision exists;

when determining that the resource collision exists, generating a resource collision message; and sending the resource collision message to the base station.

With reference to the eighth aspect, in a first possible implementation of the eighth aspect, the performing detection on a transmission resource according to the transmission resource index includes:

performing detection on the transmission resource corresponding to the transmission resource index; and if a signal is successfully detected on the transmission resource, but as the user equipment moves, a change range of signal energy on the transmission resource is less than a preset threshold, and no signal can be successfully detected on the transmission resource again, and still no signal can be successfully detected within a preset duration, determining that the resource collision exists between the first UE and the second UE.

With reference to the ninth aspect, in a first possible implementation of the ninth aspect, the obtaining location information of the first UE includes:

receiving the location information of the first UE; or determining the location information of the first UE according to a transmit signal of the first UE; or using previously obtained location information of the first UE as current location information of the first UE.

With reference to the foregoing possible implementation, in a second possible implementation of the ninth aspect, the receiving the location information sent by the first UE includes:

receiving GPS location information of the first UE; or receiving estimated location information of the first UE, where the estimated location information is location information obtained by the first UE through estimation according to a positioning reference signal transmitted by the base station; or receiving area index information of an area in which the first UE is currently located.

With reference to the foregoing possible implementation, in a third possible implementation of the ninth aspect, the determining the location information of the first UE according to a transmit signal of the first UE includes:

determining a relative azimuth between the first UE and the base station according to the transmit signal of the first UE; and determining a distance between the first UE and the base station according to a detected energy value of the transmit signal of the first UE.

With reference to the foregoing possible implementation, in a fourth possible implementation of the ninth aspect, the transmit signal of the first UE is:

a physical uplink control channel PUCCH signal; or a physical uplink shared channel PUSCH signal; or a random access channel RACH; or a PUCCH signal used to carry a scheduling request SR; or a PUSCH signal used to carry a buffer status report BSR; or a communication signal between the first UE and another UE.

With reference to the foregoing possible implementation, in a fifth possible implementation of the ninth aspect, after the sending the allocated transmission resource to the first UE, the method further includes:

determining whether a resource collision exists between the first UE and the second UE; and when confirming that the resource collision exists between the first UE and the second UE, reallocating a transmission resource to the first UE or the second UE.

With reference to the foregoing possible implementation, in a sixth possible implementation of the ninth aspect, after the sending the allocated transmission resource to the first UE, the method further includes:

sending a resource multiplex message to the first UE and the second UE separately, where the resource multiplex message is used to notify that the same transmission resource is allocated to the first UE and the second UE.

With reference to the foregoing possible implementation, in a seventh possible implementation of the ninth aspect, the determining whether a resource collision exists between the first UE and the second UE includes:

determining, in real time according to the location information of the first UE and location information of the second UE, whether the distance between the first UE and the second UE is less than a second preset distance; and when confirming that the distance between the first UE and the second UE is less than the second preset distance, determining that the resource collision exists between the first UE and the second UE.

With reference to the foregoing possible implementation, in an eighth possible implementation of the ninth aspect, the determining whether a resource collision exists between the first UE and the second UE includes:

when receiving a resource collision message sent by the first UE, determining that the resource collision exists between the first UE and the second UE, where the resource collision message is obtained by the first UE by performing detection on the transmission resource at a silent time; or when receiving a resource collision message sent by the second UE, determining that the resource collision exists between the first UE and the second UE, where the resource collision message is obtained by the second UE by performing detection on the transmission resource at a silent time.

With reference to the foregoing possible implementation, in a ninth possible implementation of the ninth aspect, before the determining whether a resource collision exists between the first UE and the second UE, the method further includes:

sending silence setting information to the first UE and the second UE separately, where the silence setting information is used to instruct the UEs to keep silent in a specified transmission timeslot.

With reference to the foregoing possible implementation, in a tenth possible implementation of the ninth aspect, the determining whether a resource collision exists between the first UE and the second UE includes:

when receiving a resource collision message sent by third UE, determining that the resource collision exists between the first UE and the second UE, where the third UE is UE different from the first UE and the second UE within the coverage of the base station, and the resource collision message is obtained by the third UE by performing detection on the transmission resource.

With reference to the foregoing possible implementation, in an eleventh possible implementation of the ninth aspect, before the determining whether a resource collision exists between the first UE and the second UE, the method further includes:

sending a broadcast message to the UE within the coverage of the base station, where the broadcast message carries a transmission resource index allocated to the first UE and the second UE, and the transmission resource index is used by the UE within the coverage of the base station to perform detection on the transmission resource.

With reference to the tenth aspect, in a first possible implementation of the tenth aspect, the sending location information of the user equipment to the base station includes:

sending GPS location information to the base station; or sending estimated location information to the base station, where the estimated location information is location information obtained by the user equipment through estimation according to a positioning reference signal transmitted by the base station; or sending area index information of an area in which the user equipment is currently located to the base station.

With reference to the foregoing possible implementation, in a second possible implementation of the tenth aspect, after the receiving the transmission resource allocated by the base station, the method further includes:

receiving a resource multiplex message sent by the base station; and periodically sending the location information of the user equipment to the base station, so that the base station determines, according to the location information of the user equipment, whether a resource collision exists.

With reference to the foregoing possible implementation, in a third possible implementation of the tenth aspect, after the receiving the transmission resource allocated by the base station, the method further includes:

receiving silence setting information sent by the base station, where the silence setting information is used to instruct the UE to keep silent in a specified transmission timeslot;

keeping silent in the specified transmission timeslot according to the silence setting information;

when detecting that a detected energy value of the transmission resource occupied by the user equipment in the specified transmission timeslot is greater than a second energy threshold, determining that a resource collision exists;

when determining that the resource collision exists, generating a resource collision message; and sending the resource collision message to the base station.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

The invention claimed is:
1. A base station, comprising:
   a receiver, configured to receive a resource allocation request from first user equipment (UE) within coverage of the base station;
   a processor, configured to allocate, when the resource allocation request received by the receiver carries a transmission resource index, a transmission resource to the first UE according to the transmission resource index; and
   a transmitter, configured to send, to the first UE, the transmission resource allocated by the processor;
   wherein when the resource allocation request does not carry any transmission resource index:
   the processor is configured to obtain location information of the first UE when the processor determines that all transmission resources of the base station are already allocated;

the processor is configured to determine, according to the location information of the first UE and location information of UEs to which the processor currently has already allocated transmission resources, second UE that meets a preset condition, wherein the preset condition is that a distance between the second UE and the first UE is greater than a first preset distance; and the processor is further configured to allocate, to the first UE, a transmission resource already allocated to the second UE.

2. The base station according to claim 1, wherein the receiver is further configured to receive the location information of the first UE; and the processor is configured to obtain the location information, as the location information of the first UE; or determine the location information of the first UE according to a transmit signal of the first UE; or use location information of the first UE, as current location information of the first UE.

3. The base station according to claim 2, wherein the receiver is configured to receive at least one of the following:

global positioning system (GPS) location information of the first UE;

estimated location information of the first UE, wherein the estimated location information is location information obtained by the first UE through estimation according to a positioning reference signal transmitted by the base station; and area index information of an area in which the first UE is currently located.

4. The base station according to claim 1, wherein the transmitter is further configured to send silence setting information to the first UE and the second UE separately after the processor allocates, to the first UE, the transmission resource already allocated to the second UE, wherein the silence setting information is used to instruct the UEs to keep silent in a specified transmission timeslot.

5. An apparatus, wherein the apparatus comprises:

a receiver, configured to receive listening setting information, wherein the listening setting information is used to notify the apparatus of a duration of listening;

a processor, configured to determine, according to the listening setting information received by the receiver, a duration of listening to be performed on transmission resources within coverage of a base station;

the processor, configured to listen to the transmission resources within the coverage of the base station; and a transmitter, configured to send a resource allocation request to the base station when a duration of the listening performed by the processor reaches the preset duration; wherein the receiver is further configured to receive the transmission resource allocated by the base station.

6. The apparatus according to claim 5, wherein before the processor listens to the transmission resources within the coverage of the base station, the receiver is further configured to receive quantity setting information sent by the base station, wherein the quantity setting information is used to notify the UE of a quantity of transmission resource indexes to be carried when the resource allocation request is sent.

7. The apparatus according to claim 5, wherein the transmitter is further configured to send configured to send location information of the apparatus to the base station when it is determined that no transmission resource listened to by the processor is idle.

8. The apparatus according to claim 7, wherein the transmitter is specifically configured to:

send GPS location information to the base station; or send estimated location information to the base station, wherein the estimated location information is location information obtained by the apparatus through estimation according to a positioning reference signal transmitted by the base station; or send area index information of an area in which the apparatus is currently located to the base station.

9. The apparatus according to claim 5, wherein after receiving the transmission resource allocated by the base station, the receiver is further configured to receive silence setting information sent by the base station, wherein the silence setting information is used to instruct the UE to keep silent in a specified transmission timeslot; and the processor is further configured to keep silent in the specified transmission timeslot according to the silence setting information received by the receiver;

the processor, configured to determine, when it is detected that a detected energy value of the transmission resource occupied by the apparatus in the specified transmission timeslot is greater than a second energy threshold, that a resource collision exists; and the processor, configured to generate a resource collision message when the processor determines that the resource collision exists; wherein the transmitter is further configured to send the resource collision message generated by the processor to the base station.

10. A resource allocation method, comprising:

receiving a resource allocation request from a first user equipment (UE) within coverage of a base station;

when the resource allocation request carries a transmission resource index, allocating a transmission resource to the first UE according to the transmission resource index; and sending the allocated transmission resource to the first UE; and when the resource allocation request does not carry any transmission resource index;

when determining that all transmission resources of the base station are already allocated, obtaining location information of the first UE;

determining, according to the location information of the first UE and location information of UEs to which transmission resources are currently already allocated, second UE that meets a preset condition, wherein the preset condition is that a distance between the second UE and the first UE is greater than a first preset distance; and allocating, to the first UE, a transmission resource already allocated to the second UE.

11. The method according to claim 10, wherein obtaining location information of the first UE comprises at least one of the following:

receiving the location information of the first UE;

determining the location information of the first UE according to a transmit signal of the first UE; and using previously obtained location information of the first UE as current location information of the first UE.

12. The method according to claim 11, wherein receiving the location information sent by the first UE comprises receiving at least one of the following:

GPS location information of the first UE;

estimated location information of the first UE, wherein the estimated location information is location information obtained by the first UE through estimation according to a positioning reference signal transmitted by the base station; and area index information of an area in which the first UE is currently located.

13. A resource allocation method performed by an apparatus, comprising:

receiving listening setting information, wherein listening setting information is used to notify the apparatus of a duration of listening;

determining, according to the listening setting information, a duration of listening to be performed on transmission resources within coverage of a base station; listening to the transmission resources within the coverage of the base station;

when a duration of the listening reaches the preset duration, sending a resource allocation request to the base station, so that the base station allocates a transmission resource according to the resource allocation request; and receiving the transmission resource allocated by the base station.

14. The method according to claim 13, before listening to the transmission resources within the coverage of the base station, further comprising:

receiving energy threshold information from the base station, wherein the energy threshold information is used to notify the UE of the first energy threshold in listening.

15. The method according to claim 13, before sending a resource allocation request to the base station when a duration of the listening reaches the preset duration, further comprising:

receiving quantity setting information sent by the base station, wherein the quantity setting information is used to notify the UE of a quantity of transmission resource indexes to be carried when the resource allocation request is sent; and determining, according to the quantity setting request, the quantity of transmission resource indexes to be carried in the resource allocation request.

16. The method according to claim 13, further comprising:

when determining that no transmission resource that is listened to is idle, sending location information of the apparatus to the base station.

17. The method according to claim 16, wherein sending the location information of the apparatus to the base station comprises sending at least one of the following:

GPS location information to the base station;

estimated location information to the base station, wherein the estimated location information is location information obtained by the apparatus through estimation according to a positioning reference signal transmitted by the base station; and area index information of an area in which the apparatus is currently located to the base station.

18. The method according to claim 13, after receiving the transmission resource allocated by the base station, further comprising:

receiving a resource multiplex message sent by the base station; and periodically sending location information of the apparatus to the base station, so that the base station determines, according to the location information of the apparatus, whether a resource collision exists.

* * * * *